United States Patent [19]

Golub et al.

[11] Patent Number: 5,050,090

[45] Date of Patent: Sep. 17, 1991

[54] OBJECT PLACEMENT METHOD AND APPARATUS

[75] Inventors: Alexander J. Golub, Lewisville; Oscar F. Garza; C. Pat Joiner, both of Winston-Salem; Alan W. Neebe, Chapel Hill, all of N.C.

[73] Assignee: R. J. Reynolds Tobacco Company, Winston-Salem, N.C.

[21] Appl. No.: 331,621

[22] Filed: Mar. 30, 1989

[51] Int. Cl.$^5$ .............................................. G06F 15/20
[52] U.S. Cl. ..................................... 364/478; 414/273
[58] Field of Search ... 364/478, 468, 300, 200 MS File, 364/900 MS File; 414/902, 900, 922, 286, 791.6, 799, 273, 275

[56] References Cited

U.S. PATENT DOCUMENTS 4,641,271  2/1987  Konishi et al. ...................... 364/478
4,692,876  9/1987  Tenma et al. ................... 364/478 X

OTHER PUBLICATIONS

"AALPS-A Knowledge Based System for Aircraft Loading," Debra Anderson & Charles Ortiz, IEEE Expert, vol. 2, No. 4, Winter, 1987, pp. 71-79.
CAPE Container Loading I & II, CAPE Systems & Consulting Servs., Div. of Spectrum Planning Inc., Richardson, TX; undated
CAPE Multiproduct Loading, CAPE Systems & Consulting Servs., Div. of Spectrum Planning, Inc., Richardson, TX; undated.

Primary Examiner—Joseph Ruggiero
Attorney, Agent, or Firm—Bell, Seltzer, Park & Gibson

[57] ABSTRACT

An object placement method and apparatus which obtains efficiency and optimized placement by providing a library of object placement patterns, each pattern in said library representing a plurality of objects filling a pattern line or series of pattern lines of a three-dimensional space. For each pattern line, a first type object (for example, a first size object) to be placed is selected and the pattern which minimizes the portion of the three-dimensional space used to place a number of first type objects, subject to at least one constraint factor, is determined. A representation of the objects in the rows according to the determined pattern may be provided. According to another aspect of the invention, linking restrictions between the objects of differing sizes may be provided. The linking restrictions are patterns from the library which may not be employed with objects of differing types in a line of the three-dimensional space. The linking restrictions may reject patterns that lead to irregular pattern geometries, inefficient use of space, unstable characteristics or any other undesirable configuration of the two object types in a single pattern line. The element placement technique of the present invention determines the patterns which minimize the portions of the three-dimensional space used to place the objects consistent with at least one constraint factor without violating the linking restrictions.

44 Claims, 18 Drawing Sheets

OBJECT PLACEMENT METHOD AND APPARATUS

FIELD OF THE INVENTION

This invention relates to the placement of objects in a three-dimensional space and more particularly, to an object placement method and apparatus for optimally assigning a plurality of objects having differing placement characteristics to positions within pattern lines in a three-dimensional space.

BACKGROUND OF THE INVENTION

In the present state of the art, object placement techniques are used to load various three-dimensional spaces, such as trucks or warehouses. Computer programs may be used to implement the instructions to determine the optimal placement of these objects.

Object placement programs are employed for generating an optimized placement of objects within a three-dimensional space. The objects to be placed may be boxes, crates, cartons, components or any other object. An object placement program generates a series of patterns which optimizes the combination of the number of objects.

Various object placement programs and techniques are known in the art. However, known placement programs and techniques often do not adequately handle the complexity of placing a plurality of objects of differing placement characteristics, including size, while satisfying stability and other constraints, such as characteristics of objects once placed, linking constraints when differing type objects are placed in a single pattern line, and possible object damage. As the number of differing type objects increase, the placement programs and techniques become more complex and ineffective. Moreover, the resulting placement is often not optimal in terms of number of components placed, minimization of space, stability, and other constraints.

It is often desirable to handle many object types in an efficient manner since most loads to transport or store will contain more than one object type. The instant invention can efficiently place several objects in a desired three-dimensional space such as a truck.

SUMMARY OF THE INVENTION

It is therefore an object of the invention to provide an object placement program for assigning a plurality of objects having differing placement characteristics to positions in a series of patterns.

It is another object of the invention to provide an object placement program which optimizes the number of objects placed subject to at least one constraint factor.

It is yet another object of the invention to provide an object placement program that efficiently places objects of differing placement characteristics within one pattern line.

These and other objects are accomplished by an object placement method which obtains its efficiency and optimized placement effect by providing a library of object placement patterns, each pattern in said library representing a plurality of objects filling a pattern line or a series of pattern lines of a three-dimensional space. For each pattern line, a first type of object (for example, a first size object) to be placed is selected and the pattern which minimizes the portion of the three-dimensional space used to place a number of first type objects subject to at least one constraint factor is determined. A representation of the objects in the rows according to the determined pattern may be provided.

According to another aspect of the invention, linking restrictions between the objects of differing types may be provided. The linking restrictions are patterns from the library which may not be employed with objects of differing types in a line of the three-dimensional space. The linking restrictions may reject patterns that will lead to irregular pattern geometrics, inefficient use of space, unstable characteristics or any other undesirable configuration of two object types in a single pattern line. The object placement method of the present invention determines the patterns which minimize the portion of the three-dimensional space used to place the objects consistent with at least one constraint factor without violating the linking restrictions.

According to one embodiment of the invention, objects of differing sizes having six sides may be placed in a three-dimensional space by providing a library of patterns, as described above, having several different pattern types, selecting patterns from each pattern type which maximize the combination of the number of objects of a first size consistent with at least one constraint factor associated therewith; and determining which of the selected patterns minimizes the portion of the three-dimensional space used to place a given number of objects of the first size consistent with at least one constraint factor associated therewith. The constraint factor may be characteristics of the three-dimensional space, damage considerations for the objects once placed, stability of the objects once placed, or any other placement consideration. In one embodiment of the invention, the constraints are implemented through penalty factors associated with certain type patterns. If a pattern remains unfilled after all objects of the first size are placed, a linking pattern which does not violate any linking restrictions is determined. The linking patterns maximize the number of objects of a succeeding size for placement in the unfilled pattern.

DETAILED DESCRIPTION OF THE INVENTION

There are illustrated diagrams and flow charts showing the steps of the object placement method in its basic form as well as with optional features. The items will be placed in a three-dimensional space which may be a truck or a warehouse or any other space. The items to be placed are referred to as objects and may include any type of cases or cartons or components.

Figure 1:
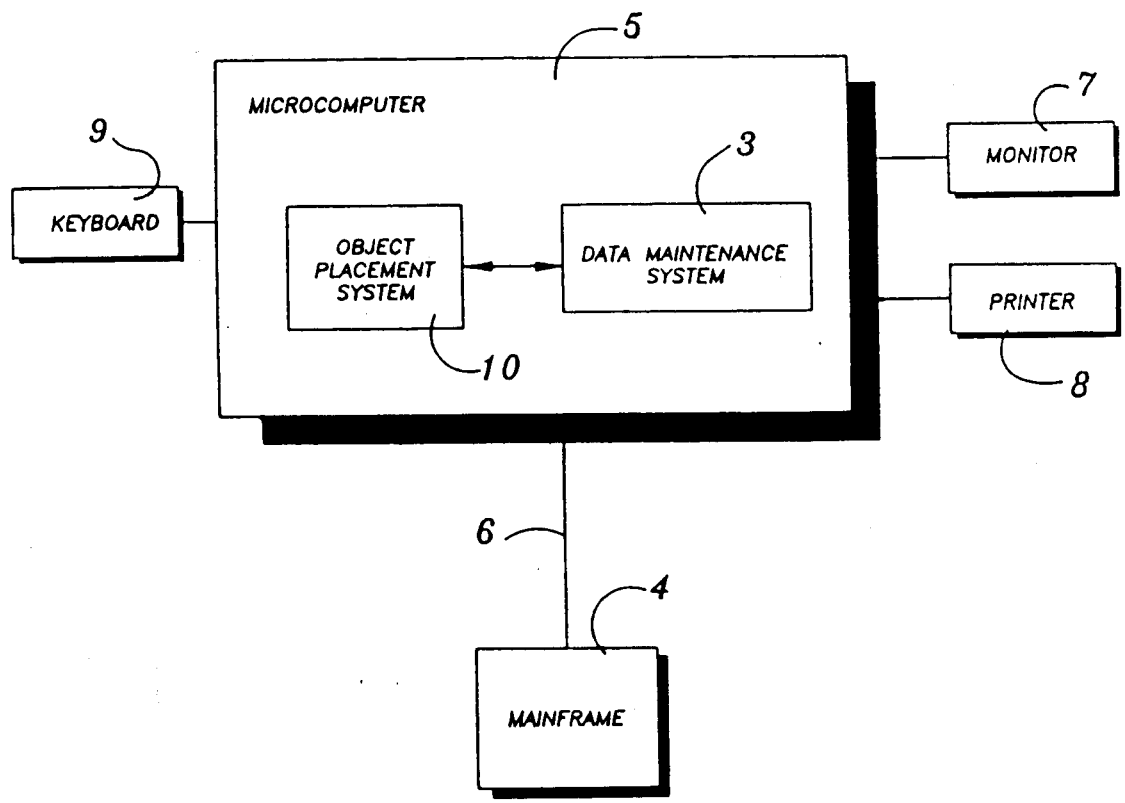
FIG. 1 illustrates a computer system incorporating the object placement program of the present invention.

Referring now to FIG. 1, there is shown a block diagram of the object placement apparatus and method programmed in a computer system. The computer system may be programmed in the Basic or Fortran programming language or any other appropriate language. Preferably, the object placement apparatus and method is implemented in a microcomputer system consisting of two subsystems: an object placement system 10 and a data maintenance system 3.

The object placement system 10 includes the programs performing some active function in the process of determining the actual load for the three dimensional space (i.e. pattern selection). The processing may be done in real time on a microcomputer 5, for example, an IBM Personal Computer/AT. The procedure may be memory driven. The object placement system 10 may include a link 6 to a mainframe 4. The manifest (containing the information about the objects to be loaded) may be down-loaded from the mainframe to the microcomputer hard disk via link 6 or directly entered into the microcomputer via keyboard 9. The layout of the manifest may take into account certain aspects of the objects to be placed. For example, if the objects are to be loaded in a truck for transport, the most popular or best selling objects may be placed in the manifest so that these items are the last to be placed and, therefore, first to be removed. If the weight of the objects within a moving truck is a concern, heavy and light objects can be interspersed so as to level the weight within the truck.

After receipt of the manifest, an operator may edit the manifest to alter the object types or quantities through the microcomputer. The operator then provides the dimensions of the three-dimensional space to be filled and runs the program. Graphic or other representations of the selected patterns may be provided on monitor 7 or printed on printer 8.

The data maintenance system 3 includes those programs and data files that maintain data or perform a support function for the operational programs, for example, the pattern library object identifiers which correlate the placement characteristics of objects to object file numbers when received on the manifest.

Figure 2:
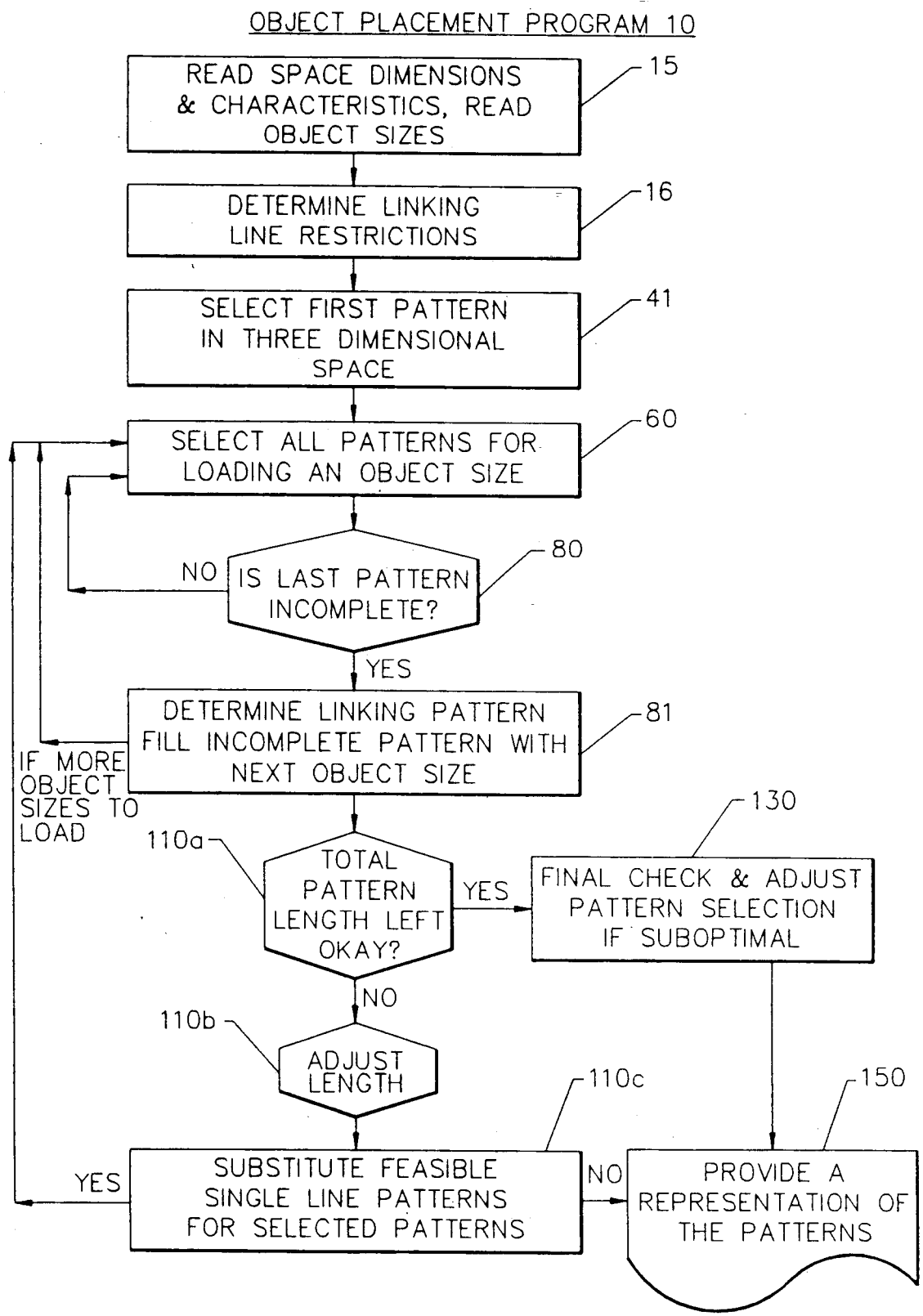
FIG. 2 illustrates an overview of the method performed by an object placement program according to the present invention.

Referring now to FIG. 2, object placement system 10 generally operates as follows: The system accepts input information (block 15) which may include object file numbers or identification numbers, placement characteristics of each object, and the characteristics of the three-dimensional space into which the objects are to be placed, as well as other constraints for the objects in the three-dimensional space, such as stability, damage, or weight factors. For purposes of illustration, object placement system 10 will be described where the object characteristic is the size of the object and the three-dimensional space characteristic is the size of the three-dimensional space. It will be understood by those having skill in the art that other characteristics, for example, weight or combinations of characteristics—for example, size, weight, and stability—may be employed for optimizing placement according to the present invention.

Still referring to FIG. 2, the inputs 15 to the object placement system 10 are the shipping manifest, the three-dimensional space dimensions, and files containing measurements of the different object sizes and loading patterns. The system 10 may consider the various object types or sizes in turn, and preferably in the same sequence as they appear on the manifest. The differing object types or sizes may be grouped in the manifest according to like placement characteristics. The manifest may be arranged from the front of the three-dimensional space to the rear of the three-dimensional space. Feasible patterns for the object type being considered are obtained first. For each different object size to be loaded, the object placement system 10 selects a set of patterns to be used such that: (a) the patterns physically fit into the three-dimensional space; (b) the total number of objects within the selected patterns is at least equal to the net number of objects to be loaded; (c) certain restrictions pertaining to the loading sequence, position in the three-dimensional space, and pattern types are satisfied; and (d) the total space occupied of the selected patterns is as small as possible. The formation of the pattern library is discussed in greater detail with respect to FIG. 3.

Next, linking pattern restrictions are determined based on the differences in placement characteristics between two object types (block 16), i.e., between two object sizes. Linking patterns are those patterns having two or more object types in them. They help to efficiently accomplish the transition between two object types by removing certain patterns from the pool of feasible patterns. Linking pattern restrictions are restrictions on the types of patterns that can be used in a linking pattern. These restrictions may be based on the difference in dimensions (height, width, length) of the objects to be placed within a three-dimensional space. Linking restrictions are determined between consecutive differing object types. For example, if a manifest contains only one size object, there will be no linking restrictions. If there are five differing sizes in the manifest, four linking restrictions are determined, although some of the restrictions may not be used, for example, when one type object fills a pattern completely and the next type object starts a new pattern. Linking patterns and linking pattern restrictions are described in more detail in connection with FIGS. 4, 7 and 8.

Still referring to FIG. 2, if in the three-dimensional space the first area to be loaded is irregular (differs from the remaining area), a first pattern is selected for the three-dimensional space taking into account the irregularity of this portion of the three-dimensional space (block 41 in FIG. 2). The selection of this pattern is discussed in greater detail with reference to FIG. 10.

Next, a set of patterns is selected which minimizes the combination of the number of objects placed in a pattern consistent with any constraint factors associated with the chosen pattern (block 60). The provision of a library of patterns and the selection of this optimal pattern is described in greater detail with reference to FIGS. 3, 6 and 9.

When all objects of a first object size have been assigned positions in patterns, the program determines if there is any space left in the final pattern (block 80 in FIG. 2). If so, this pattern will become a linking pattern, i.e., the pattern will be filled with more than one object type (block 81). The area not filled with objects of the first size is filled then with objects of the second size or any succeeding sizes. If, after filling the linking pattern with objects of the second size or any succeeding sizes, there are additional second size objects remaining, the object placement method returns to block 60 where optimal patterns are selected for loading the second size object.

When all objects to be loaded have been placed in patterns, the object placement method may check to see if the total pattern length is within a predetermined distance from the end of the three-dimensional space (block 110a). This adjustment may be made both to ensure stability of the objects within the three-dimensional space and to ensure that the pattern length does not exceed the length of the three-dimensional space. If the total pattern length is outside the predetermined range, the object placement method 10 rearranges one or more patterns so as to add greater stability or to reduce pattern length within the three-dimensional space (blocks 110b and 110c). The adjustment of pattern length is described in greater detail with reference to FIG. 11.

Finally, a last check is made by the object placement program to detect any situation which is less than optimal (block 130). For example, a series of patterns at times may be replaced with other patterns minimizing the space used to place the objects to a greater extent. If such a less than optimal situation is detected, patterns are adjusted or replaced so as to make loading easier, increase stability, or increase the number of objects placed. The final pattern check is discussed in greater detail with reference to FIG. 11.

A representation of the loading patterns is generated (block 150) to facilitate the loading of the objects 150. This representation may be in the form of loading instructions or a pictorial representation of the optimized placement may be provided on monitor 7, printer 8, or both.

Figure 3:
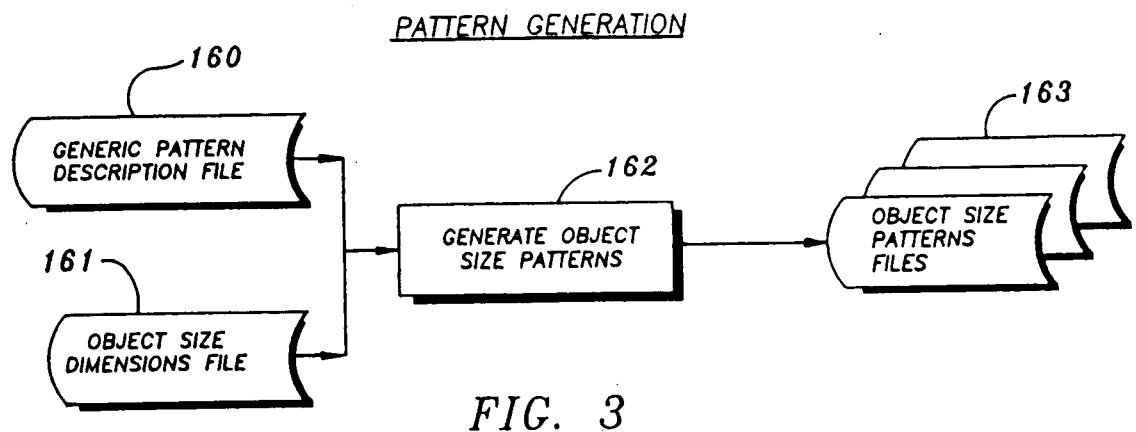
FIG. 3 illustrates an overview of the generation of a library of patterns according to the present invention.

Referring now to FIG. 3, the system for generating a library of patterns is shown. A generic pattern description file is provided which contains pattern identification numbers, total number of objects, and a description of the orientation of each object in each row of the pattern. The generic pattern description file 160 also has a description of each pattern. For example, the orientation of the objects within the pattern and the number of objects in the pattern may be described.

An object size dimensions file 161 may contain a code description for each object, an object identification, and the object type, for example, dimensions (length, width, and depth). Each object is provided with a code which is entered into the object size dimension file 161. The system recognizes the code and correlates it to information about the object, such as dimensions, weight, and product identification. The information from the generic pattern description file 160 and the object size dimension file 161 is combined to result in an object size patterns file 163.

The patterns in the generic pattern description file 160 are provided by the user or by a pattern generation program and are dimensionless. Each generic pattern is evaluated according to individual object type, for example size, in order to test for feasibility (block 162). A pattern is excluded from feasibility for a specific object if it does not meet certain criteria which may be dependent upon the three-dimensional space or the objects themselves. The determination of a feasible pattern set for an object type may be done with a comparison routine in which dimensions of the space and placement characteristics are compared to the generic pattern and if the specific objects when, placed in a pattern would violate a predetermined restriction, that pattern is excluded from feasibility. For example, in a specific case where the three-dimensional space is a typical tractor trailer truck, a pattern may be excluded from feasibility if: (1) the height would be less than 7 feet high or greater than 10 feet high; (2) the width is less than 7 feet across or greater than 8.5 feet across; or (3) an individual row would protrude by 3 inches or more in any direction over the other row types. It will be recognized that these representations are for a typical truck and other types of three-dimensional spaces will result in the feasibility restraints.

The object size patterns file 163 thus contains the set of feasible patterns for a particular object size. Each pattern in the file 163 may be given an associated identification number from the generic pattern file 160, and the pattern's total length, width, and depth. Such an identification number permits the object placement program to access the feasible patterns for each object. The object placement method generates a library having feasible patterns for each object size dependent upon a standard three-dimensional space. Each set of patterns for a specific object size is put into a separate file 163.

Figure 4:
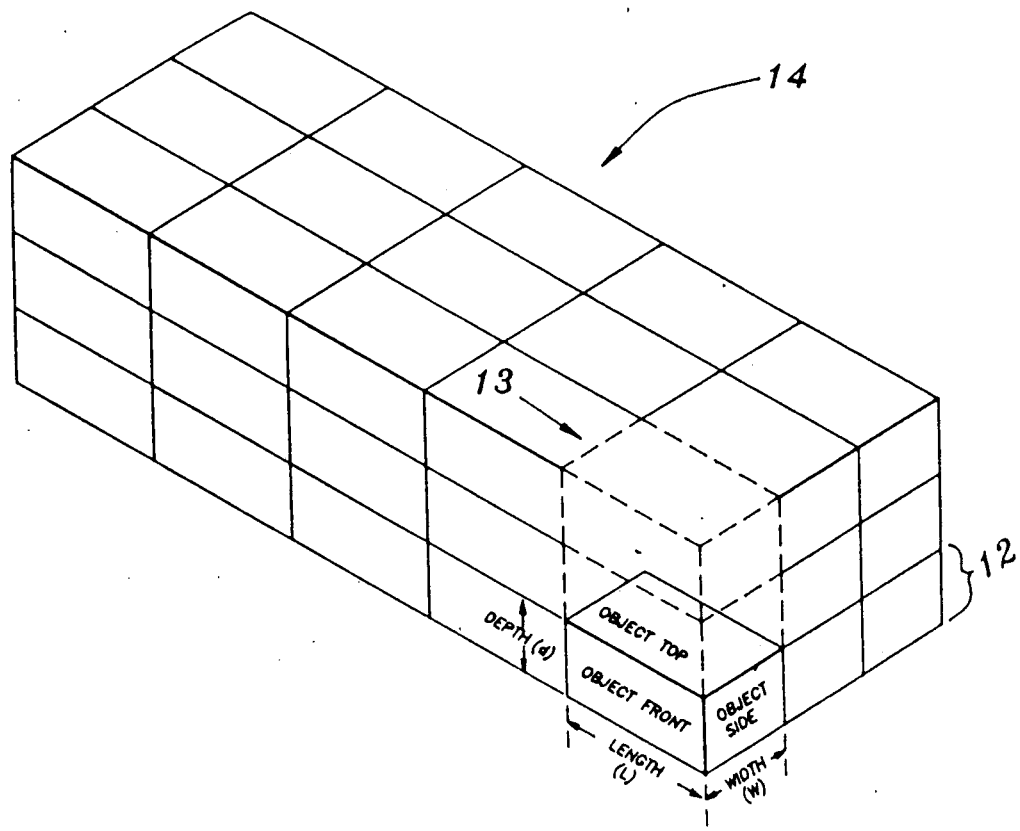
FIG. 4 illustrates the definitions for the surfaces of the objects according to the present invention.

Referring now to FIG. 4, each feasible pattern type is completely described by the orientation of the objects within the pattern and the number of object lengths, widths, and depths appearing in pattern line 13. Pattern lines 13 are formed of pattern rows 12 stacked upon other pattern rows, as seen in phantom lines in FIG. 4. In FIG. 4 the pattern lines 13 are placed within a three-dimensional truck space 14. Summing the horizontal dimension of each object in each row 12 gives the horizontal dimension of each single pattern line 13 in the pattern. Summing the number of times each row 12 is used gives the total vertical dimension of each pattern line 13. Summing the depths of all pattern lines gives the total length of the patterns within the three-dimensional space. Note that some pattern types have only one pattern line to a pattern (single line) while some pattern types have more than one pattern line to a pattern (multiline).

Note that preferably a single pattern should not have a first row type which is non-uniform in the vertical dimension. This restriction is needed because the first row of this type does not present a uniform level on which to place the second row.

Referring now to FIGS. 4 and 5, for reference purposes, an object with its surfaces defined according to one embodiment of the present invention is illustrated in FIG. 4 and pattern types are illustrated in FIGS. 5A–5E. In FIG. 4, a six-sided object is shown with its surfaces defined. In one embodiment of the invention, five pattern types are available: (1) flat—only object front surfaces are visible; (2) straight—only object side surfaces are visible; (3) tops—only object top surfaces are visible; (4) regular —only object front or object side surfaces are visible and the pattern depth is no more than one object length or two object widths; and (5)

multiline—object front, side, or top surfaces are visible and are more than one object length or two object widths in depth (i.e., there is more than one pattern line in a multiline pattern). In this embodiment, visible surfaces refer to the surfaces facing the open length of the three-dimensional space from which the space is loaded. A typical pattern for a truck has 5 rows—4 rows on the bottom of the pattern of the first type with 1 row on top representing the second type.

For example, in one embodiment of the invention, where the placement characteristic is size and the linking restrictions are to prevent irregular pattern depth geometries, the linking restrictions may include the following restrictions which are determined through comparisons of the differing object dimensions:

(1) straight or flat patterns only—this restriction will apply where any one of the following are true:

$L_2 - L_1 \leq \pm$ a predetermined distance $D_2 - L_1 \leq \pm$ a predetermined distance $2 \times W_2 - L_1 \leq \pm$ a predetermined distance $2 \times D_2 - L_1 \leq \pm$ a predetermined distance where subscript "1" refers to the first object type; subscript "2" refers to the second object type; and L=length, W=width, and D=depth.

(2) top or flat patterns only—this restriction occurs if at least one of the following conditions hold:

$D_2 - D_1 \leq \pm$ a predetermined distance $2 \times D_2 - D_1 \leq \pm$ a predetermined distance $D_2 - 2 \times D_1 \leq \pm$ a predetermined distance $L_2 - D_1 \leq \pm$ a predetermined distance $W_2 - D_1 \leq \pm$ a predetermined distance $2 \times W_2 - D_1 \leq \pm$ a predetermined distance and at least one of the following conditions apply:

$W_2 - W_1 \leq \pm$ a predetermined distance
and $L_2 - L_1 \leq \pm$ a predetermined distance $L_2 - L_1 \leq \pm$ a predetermined distance $L_2 - L_1 \leq \pm$ a predetermined distance $D_2 - L_1 \leq \pm$ a predetermined distance $2 \times W_2 - L_1 \leq \pm$ a predetermined distance $2 \times D_2 - L_1 \leq \pm$ a predetermined distance (3) Any pattern is permissible except for top patterns—this restriction applies when at least one of the following conditions are met: $W_2 - W_1 \leq \pm$ a predetermined distance and $L_2 - L_1 \leq \pm$ a predetermined distance or current object size is the last object size.

(4) No regular patterns or multiline patterns -- these restrictions apply when at least one of the following conditions are met:
at least one of:

$L_2 - L_1 \leq \pm$ a predetermined distance $D_2 - L_1 \leq \pm$ a predetermined distance $2 \times W_2 - L_1 \leq \pm$ a predetermined distance $2 \times D_2 - L_1 \leq \pm$ a predetermined distance and at least one of:

$D_2 - D_1 \leq \pm$ a predetermined distance $2 \times D_2 - D_1 \leq \pm$ a predetermined distance $D_2 - 2 \times D_1 \leq \pm$ a predetermined distance $L_2 - D_1 \leq \pm$ a predetermined distance $W_2 - D_1 \leq \pm$ a predetermined distance $2 \times W_2 - D_1 \leq \pm$ a predetermined distance (5) In this example, there are no linking restrictions when the objects meet the following criteria:
at least one of the following holds:

$D_2 - D_1 \leq$ a predetermined distance $2 \times D_2 - D_1 \leq$ a predetermined distance $D_2 - 2 \times D_1 \leq$ a predetermined distance $L_2 - D_1 \leq$ a predetermined distance $W_2 - D_1 \leq$ a predetermined distance $2 \times W_2 - D_1 \leq$ a predetermined distance AND if one of the following holds:

$W_2 - W_1 \leq$ a predetermined distance

AND $L_2 - L_1 \leq$ a predetermined distance

Figure 5A:
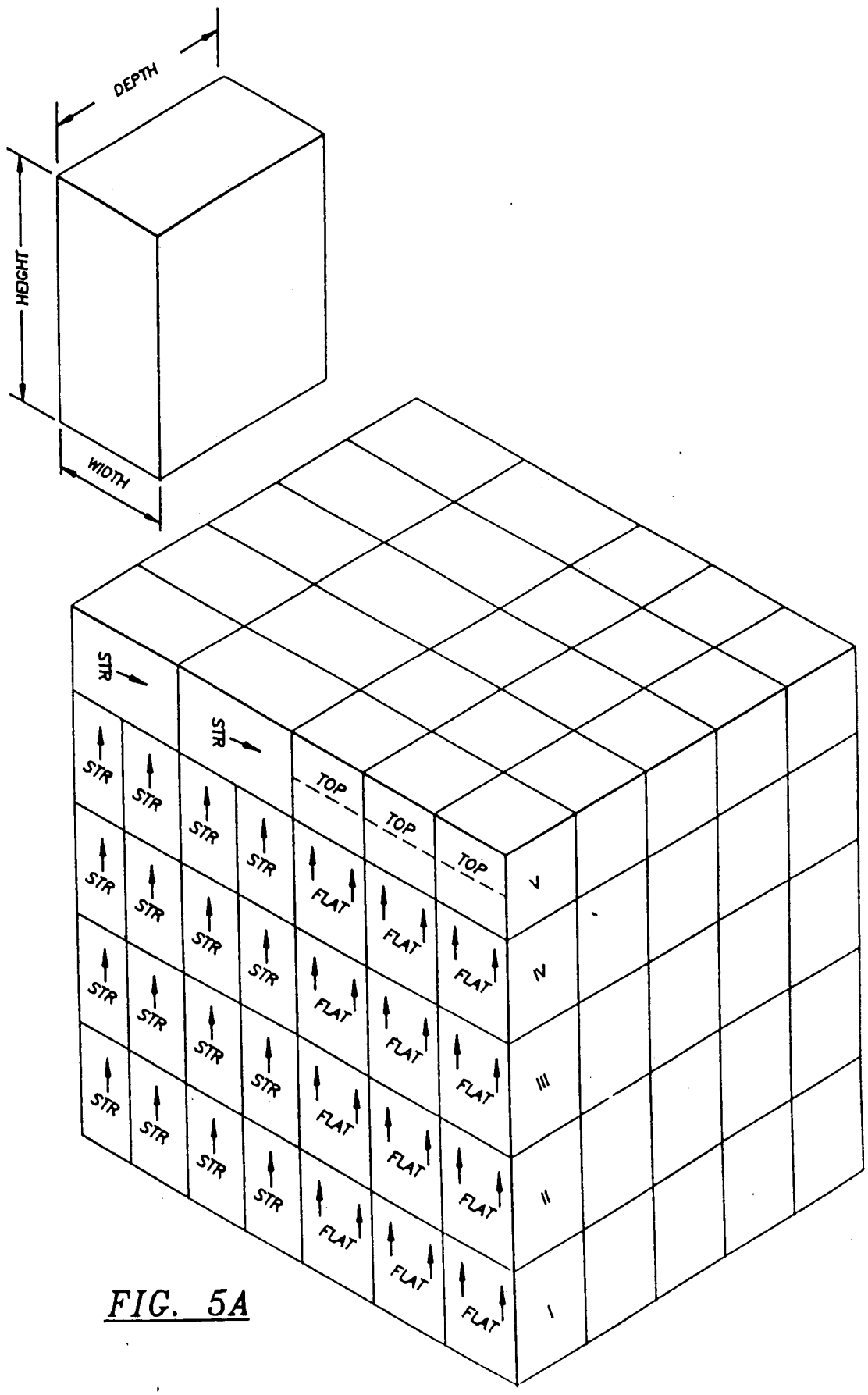
FIGS. 5A-5E illustrate various types of patterns.
Figure 5B:
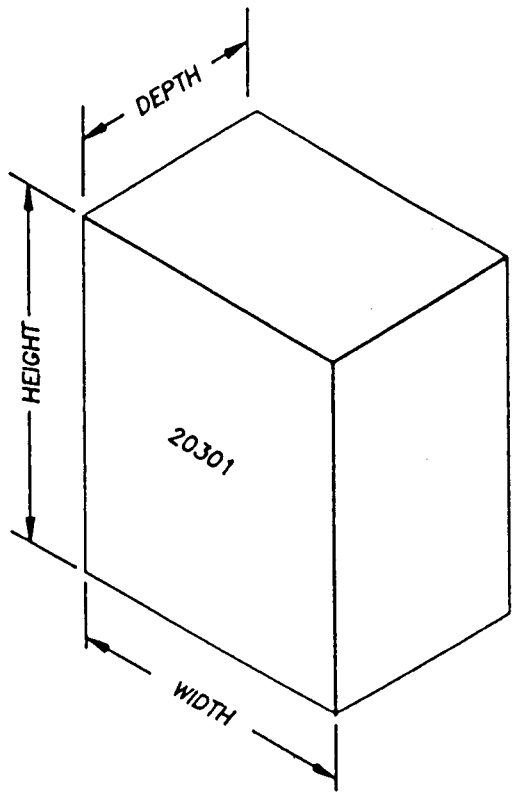
Figure 5C:
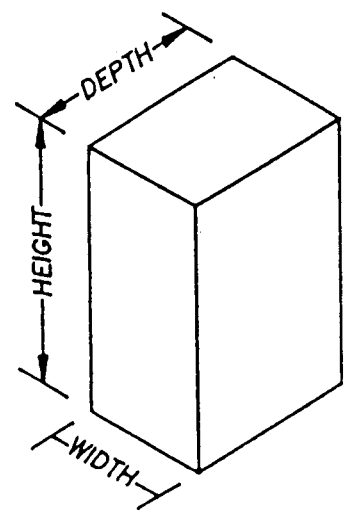
Figure 5D:
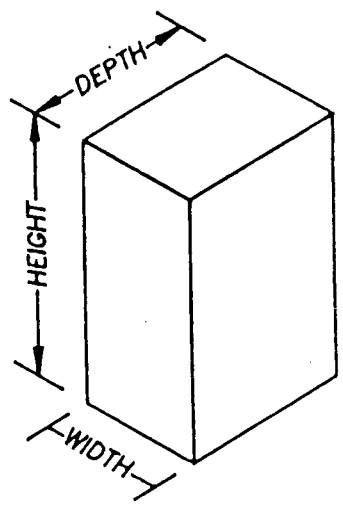
Figure 5E:
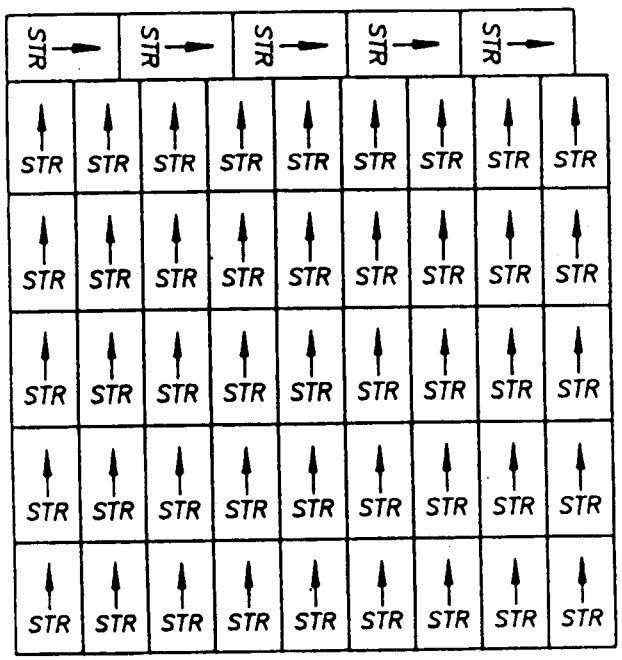
Figure 5E:
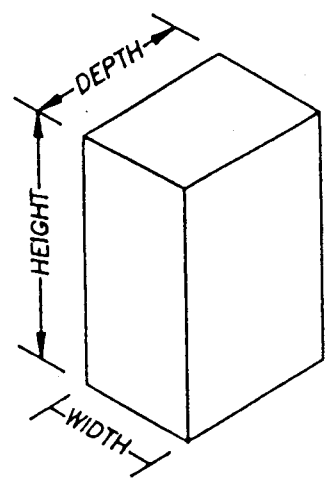

Referring now to FIGS. 5A-5E, various pattern types for this embodiment are shown indicating the positions of the objects within the pattern. FIG. 5A is an example of a multiline pattern. FIG. 5B is an example of a flat pattern. FIG. 5C is an example of a top pattern. FIG. 5D is an example of a regular pattern. FIG. 5E is an example of a straight pattern. In addition, in FIG. 5E, the x, y, and z dimensions referred to within this specification are shown.

Figure 6A:
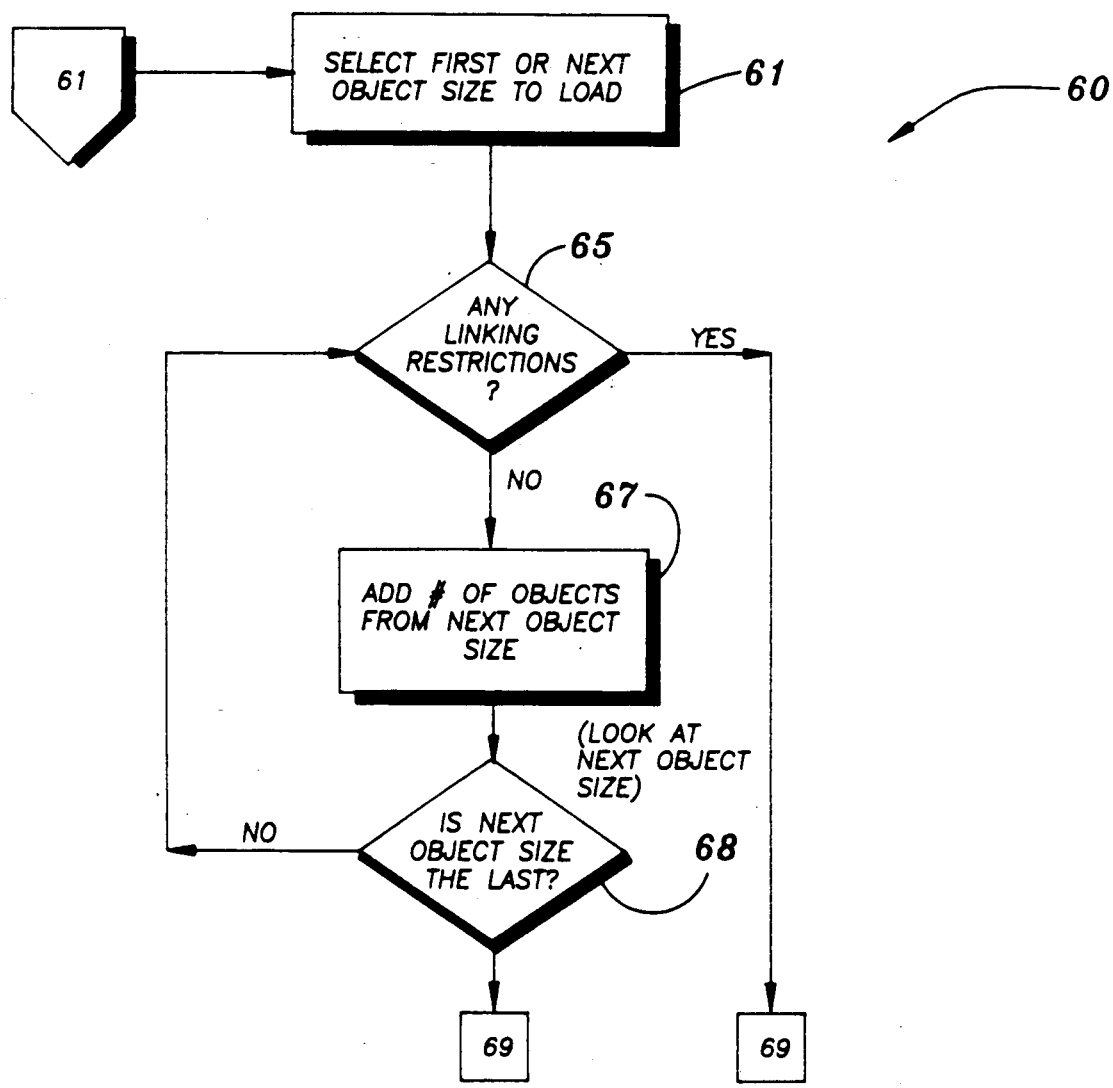
FIGS. 6A-6C illustrates an overview of the selection of maximizing patterns from pattern types and the selection of the one maximizing pattern from the pattern types, according to the present invention.

Referring now to FIG. 6A, the method performs these steps for the first object type and in the situation in which the previous object type has been loaded into the optimal patterns (i.e., patterns chosen in steps 74 or 170) and no space remains in the pattern. First, the first or next object type is selected or provided. Its type, in this instance, size, is determined (block 61). The next step in the method checks if there are any linking restrictions between the previous object type and the object type presently being analyzed 65. These restrictions have already been determined as discussed with reference to block 16 of FIG. 2 and FIG. 4. If, however, there are no linking restrictions, block 67, these type objects are added together. The processing of block 67 is performed for all differing object types (block 68). This step increases efficiency of the method since the two different object types will be analyzed as one during the course of the method. If there are linking restrictions between two object types, the differing object types cannot be considered together, so the method advances to block 69 for pattern determination.

Figure 6B:
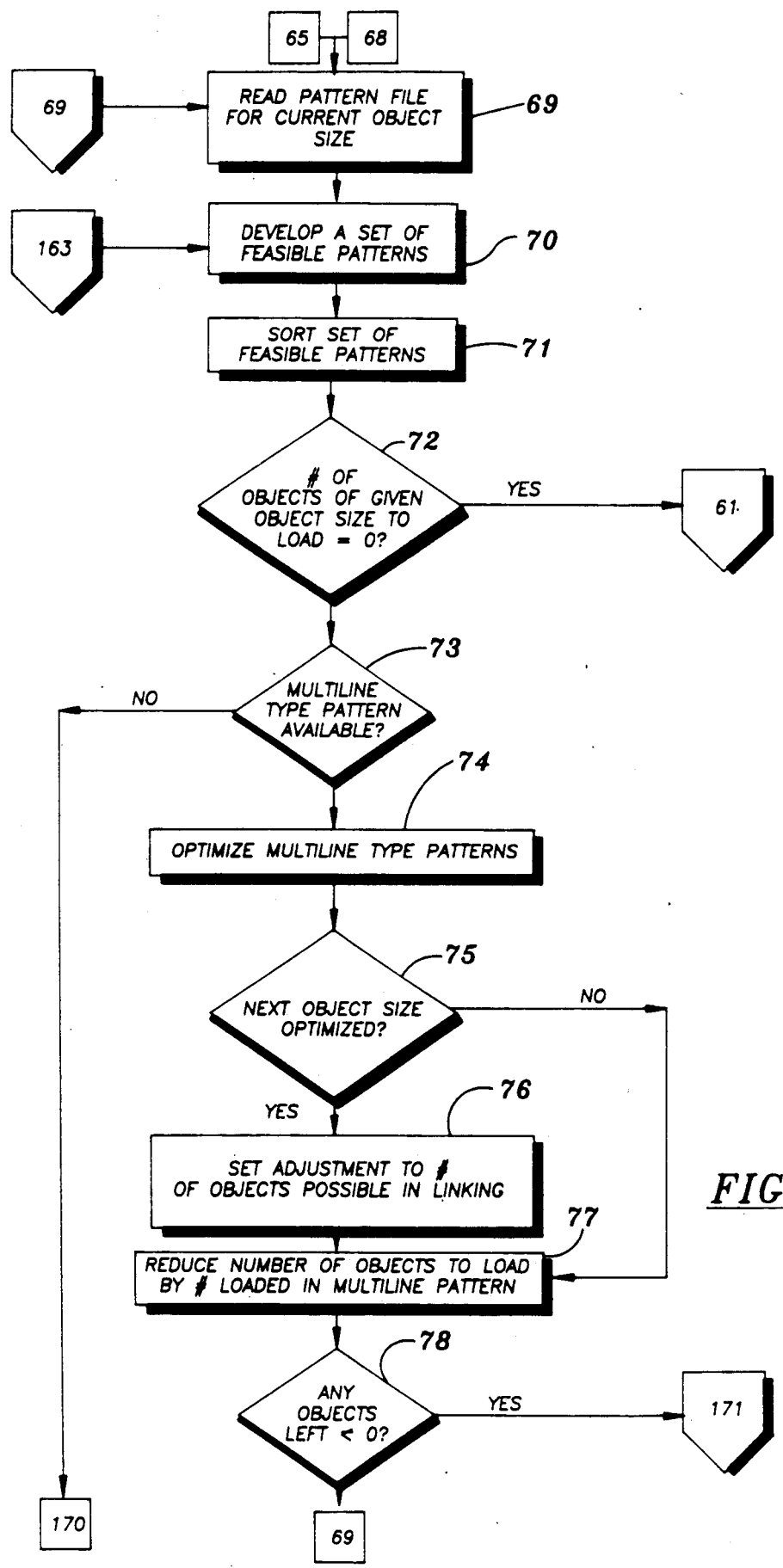

The details of the portion of the object placement program discussed in FIG. 2, block 60 are provided in FIG. 6B. Referring to FIG. 6B, the current or first object size is read into the object placement program. Then the pattern file for the current object size is read (block 69) from file 163 as discussed with reference to FIG. 3 where a set of feasible patterns is developed (block 70) for the present object type. Here, the feasible pattern set may be narrowed. For example, feasible patterns placing more than the number of current type objects available may be removed from the feasible set. Also, other pattern set narrowing steps may be taken. For example, with pattern types as in FIGS. 5B-5E, single line patterns (i.e., patterns which are not multiline) are only retained from the feasible subset when they place the most number of objects per foot of length of the three-dimensional space (i.e., pattern having the greatest loading efficiency) for that type pattern. For multiline patterns, however, all patterns are retained except for those multiline patterns placing fewer objects per square foot of pattern depth than the patterns retained in the single line patterns. At this point, the constraint factors may be applied to the patterns through penalty factors associated with each pattern type. For example: if the constraint factor is stability, the amount of objects placed or the amount of space used by each pattern type can be penalized through a penalty factor which is based on known or observed performance of the pattern type. This sorting operation is designated in block 71.

The next step in the method (block 72) checks whether or not the number of objects of the first size left to be loaded is zero. If so, the next case size is considered (block 61 in FIG. 6B). If the number of first size objects left to be loaded is not zero, the next step in the method (block 73) is to check to see if any of the most efficient type patterns are available. If not, other type patterns are considered, block 79. In this embodiment, multiline patterns are typically the most efficient (i.e., they minimize the portion of the three-dimensional space used) and the method will use a multiline pattern, if it is available, in most situations.

If multiline patterns are available, those patterns are optimized using the dynamic programming method with a modified matrix, block 74. The algorithm for this dynamic programming method will be described in further detail with reference to FIG. 9. The optimization process preferably selects the pattern which minimizes the portion of the three-dimensional space used to place the objects to the greatest extent consistent with any constraint factors associated with the pattern.

Preferably, the next step (block 75) checks if the next type object is appropriate for use with the same multiline pattern referred to in block 74. If so, the multiline pattern is used with the next type object. For example, when object type relates to size, if the next object is similar to or a multiple of the previous type object's height, width, and depth dimensions, the multiline pattern may be reused because the succeeding size object's height, width, and depth dimensions is a multiple of the previous size object's height, width, and depth dimensions and will therefor evenly fit into that multiline pattern and still be optimized in terms of least amount of space used. After deciding on the optimal multiline patterns used and how many times it is used, the number of objects to be loaded is reduced by the number loaded (both preceding and succeeding) in the multiline pattern block 76.

Figure 6C:
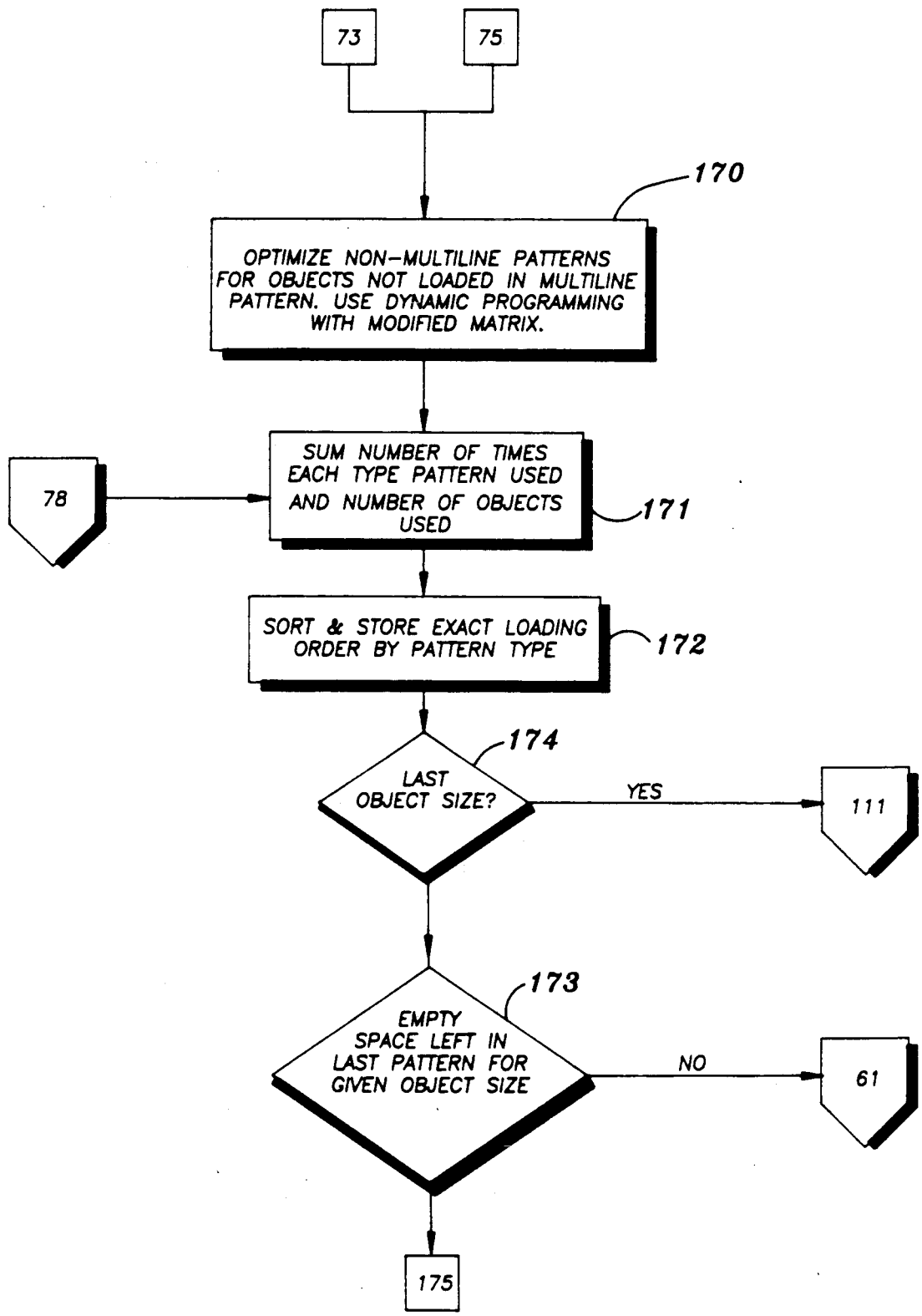

The method next checks to determine whether there are objects left to be loaded of the object type being analyzed (block 78). If there are none, housekeeping type steps may be performed on the number of objects placed and the patterns. If, however, there are objects left of the object type being analyzed and if there are no feasible, most efficient type (in this example, multiline) patterns to begin with, the method next looks to less efficient patterns (i.e, non-multiline type patterns). These patterns are analyzed to determine which pattern minimizes the portion of the three-dimensional space used to place the number of objects consistent with any constraint factors associated with the pattern. Referring now to FIG. 6C, a dynamic programming type algorithm with a modified matrix similar to that of FIG. 9 is preferably employed to optimize the non-multiline patterns, block 170.

Next, housekeeping type steps may be performed to calculate the number of objects used and the number of times each pattern type is used (block 171). The exact loading order is sorted and stored at block 172. The sorting and storing is performed so that a representation of the loading patterns chosen may be provided.

Figure 11:
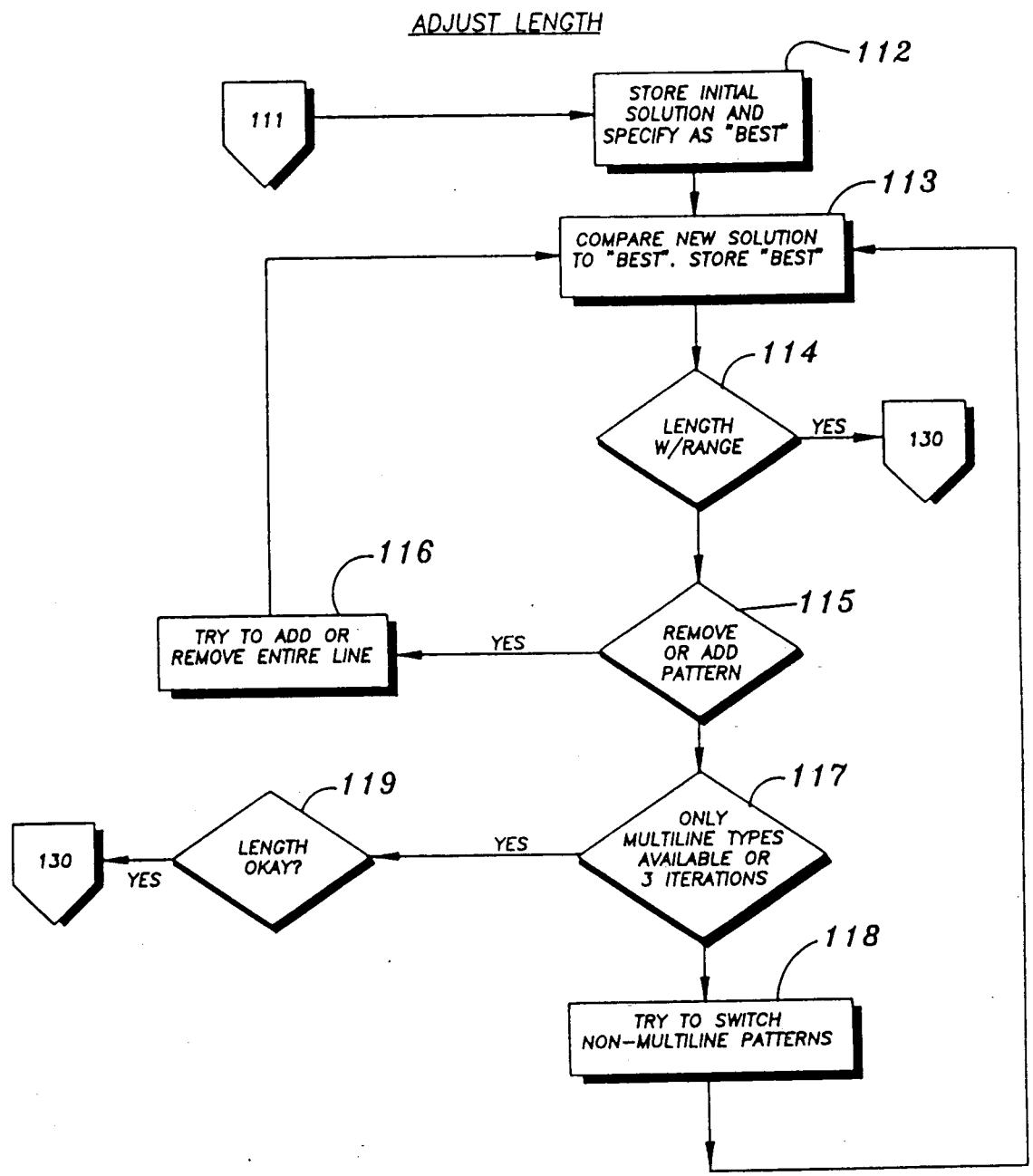
FIG. 11 illustrates the steps for adjusting the total length of the patterns within the three-dimensional space when the length is not within a predetermined range.

If, at this point, the last object type has been placed (block 173), the method advances to step 111 in FIG. 11. Here, the method adjusts the total length of the patterns within the three-dimensional space which is discussed in more detail in FIG. 11. If the object size is not the last object size (block 173) and there is space left in the last pattern, the method advances to FIG. 7 where linking patterns for the unfilled area in the last pattern are determined. If there are object types to be placed (block 173) and there is no space left in the pattern, block 174, the method advances to step 61 of FIG. 6.

Figure 7:
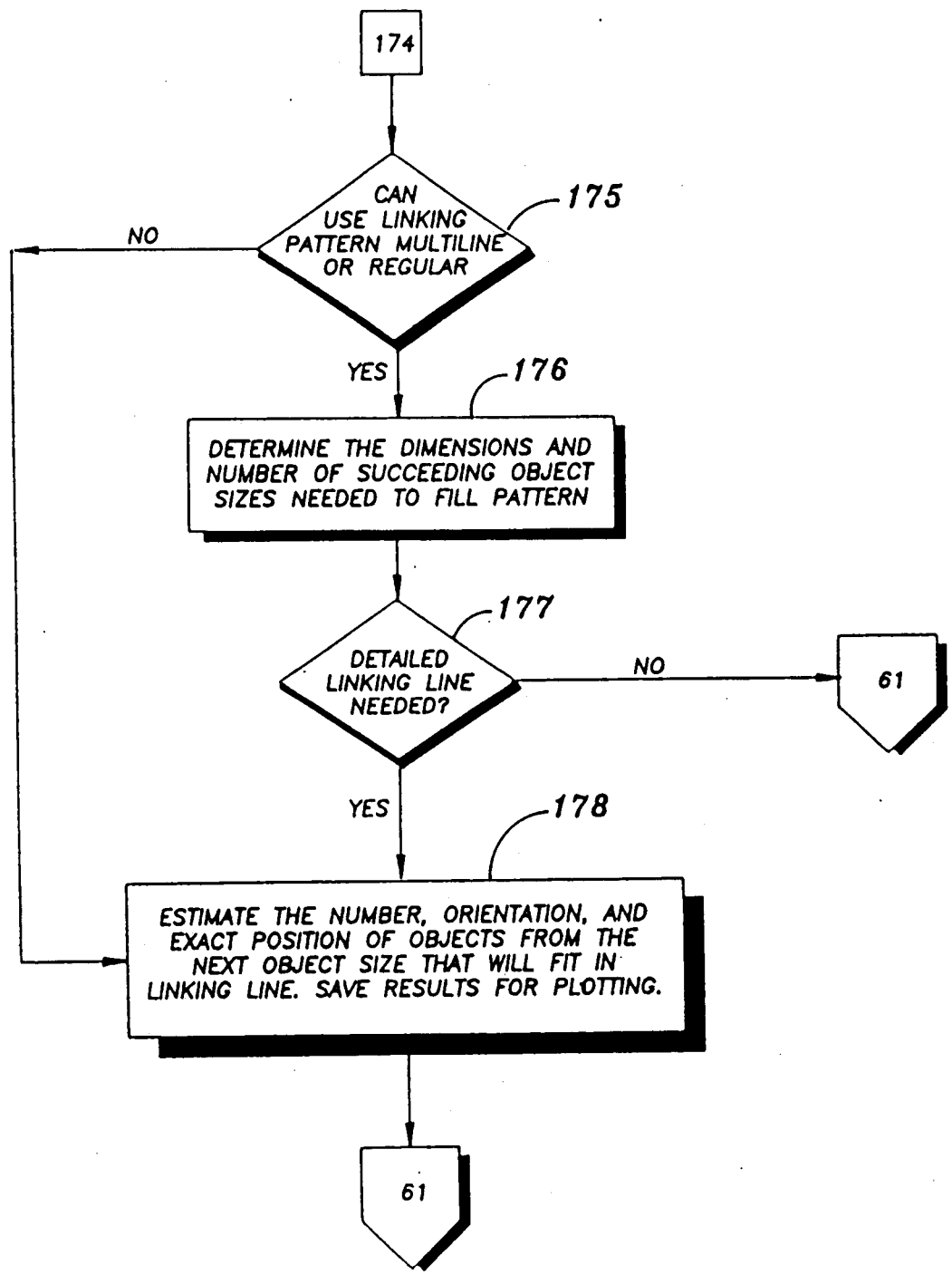
FIG. 7 illustrates an overview of the determination of linking patterns according to the present invention.

The details of blocks 80 and 81 of FIG. 2 are discussed with reference to FIG. 7. In FIG. 7, if after performing the method steps described in FIG. 6, there are empty spaces left in the last pattern used and there are object sizes left, the steps described in FIG. 7 are performed. These steps generate the pattern description for the remaining space in the last pattern using the next size object. First a determination is made as to whether or not the most efficient (in this example multiline or regular type) linking patterns were used for the first type object in the pattern line and whether the same pattern can be used for the second type object in the pattern line. This determination is made by considering the linking restrictions which have already been determined, block 75. In this example, multiline or regular type patterns may be used when two or more case sizes are physically very similar and will therefore link together readily. These type patterns are typically more efficient in placing the greatest number of objects in the least amount of space. If a multiline or regular pattern is used, the number of cases required to fill the pattern is calculated directly 176, and detailed linking line orientations are not calculated since the pattern for the second type object is known and will be continued from the first type object.

If the two object sizes to be loaded into the pattern are not of a similar size, the object placement method determines that a detailed linking line is needed in block 177. A detailed linking line is needed if there is at least one physically different case size needed to complete the pattern (i.e., not similar).

A detailed linking line provides the number of succeeding type objects, the object orientation (i.e., top, flat, side, etc.) within the pattern line of the second objects and the exact position of the second type objects within the pattern line block 178. This determination is more fully described with reference to FIG. 8.

Figure 8:
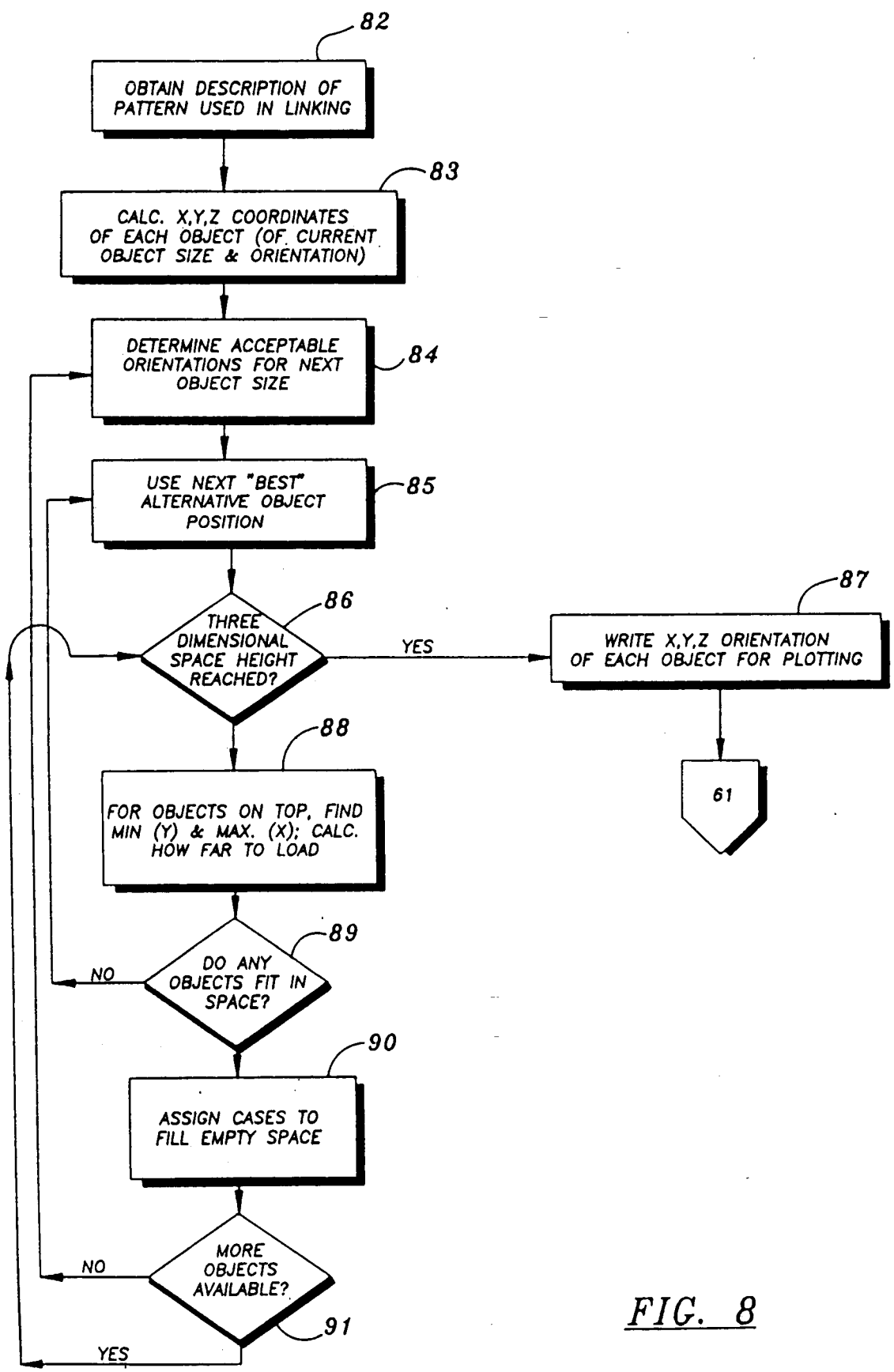
FIG. 8 illustrates the detailed steps in forming linking patterns according to the present invention.

Referring now to FIG. 8, the calculation of the detailed linking pattern lines described in block 178 of FIG. 7 is described in greater detail.

As previously mentioned, if after placing first size objects in patterns, the last pattern has space left for additional objects (see block 173 in FIG. 6), a linking pattern is required. After determining that a linking pattern is required, the object placement method obtains a description of the pattern used to place the current or first type objects from the object size patterns file 163.

Next, the height, width, and depth of each current size object are calculated, block 83. Note that if the pattern is the first pattern in an irregular size three-dimensional space, a check is made to determine if any of the objects are invading the irregular space. If so, a "phantom object" may be designated to prevent any objects from the current or subsequent object sizes from intruding into the irregular space. The calculation of the current object's x, y, and z coordinates allow the object placement method to determine the amount of space already used by the current or first type objects in the linking pattern and, therefore, the amount of space left for the next size object in the linking pattern. This calculation may be performed by keeping track of and summing the coordinates of the current or first type objects. Previous coordinates calculated by the method can be used as reference points for consideration of the next position in the pattern line.

Next, the best orientation for the next object size is determined, block 84. The best orientation preferably is the orientation that minimizes the difference in pattern depth (z coordinate) between the current and succeeding type objects. This constraint helps to increase stability of the objects and minimizes the space used by the objects. In order to accomplish this, the dimensions of the succeeding type object are compared to the depth of the pattern line to be filled. The object dimension closest in size to the pattern depth will be placed within the pattern line along the z coordinate unless this object orientation violates a linking line restriction between the current and succeeding object types. If the best orientation violates a linking restriction, the next best alternative not violating a restriction is used.

Next, the best position of the succeeding size objects within the linking pattern line is determined using the previously determined orientation (z coordinate), block 85. The program may compare the number of objects placed or the amount of pattern line cross-section used for different positions, choosing the most efficient position.

After determining the next best alternative orientation, the object placement method checks to see if the height of the placed succeeding type objects has reached the height of the three-dimensional space block 86. If so, the program stops adding new objects in that linking pattern line. The result may be stored and a representation provided to the user at a later line, block 87. If the height of the three-dimensional space has not been reached, the object placement method finds the empty space closest to the floor, and fills the most objects possible in the empty space using the currently designated best orientation and position block 88. If it is not possible to add any objects into the empty space, the object placement method may keep track of the empty space, should another smaller case size become available before the total number of objects have been placed.

The empty space may be detected by finding the object with the lowest y coordinate within the pattern line having no object located above it. If several objects exist that meet this criterion, the object with the largest x coordinate within the pattern is selected. The selected object becomes the target object. The object placement method can then find the object to the left of the target object (which always will have a smaller x coordinate than the target case) which has a larger y coordinate. The empty space to be filled extends from this case to the top of the target case.

The object placement method then determines if any of the succeeding type objects fit in the space 89. If succeeding type objects do not fill the space, the method attempts to use a different object position. If any of the succeeding type objects do fill the empty space, those cases are assigned to fill it 90. If additional objects are available, the method returns to block 86 to check if the truck height is reached and repeats the steps as shown in FIG. 8.

If no additional same size objects are available, the program returns to block 84 and determines the acceptable orientations for the next object size 91.

Figure 9A:
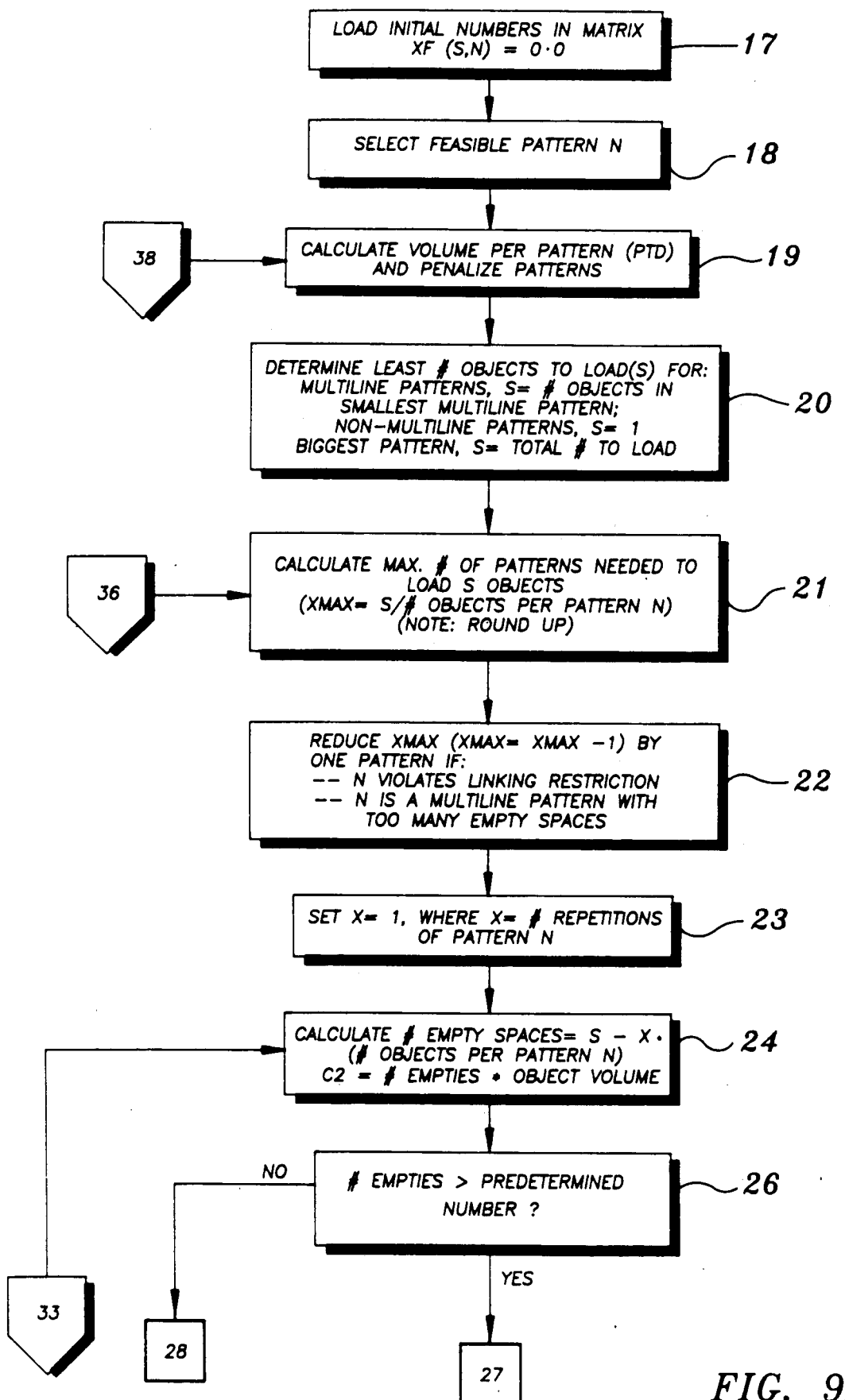
FIGS. 9A-9D illustrate steps for selecting the patterns for loading objects according to the present invention.
Figure 9B:
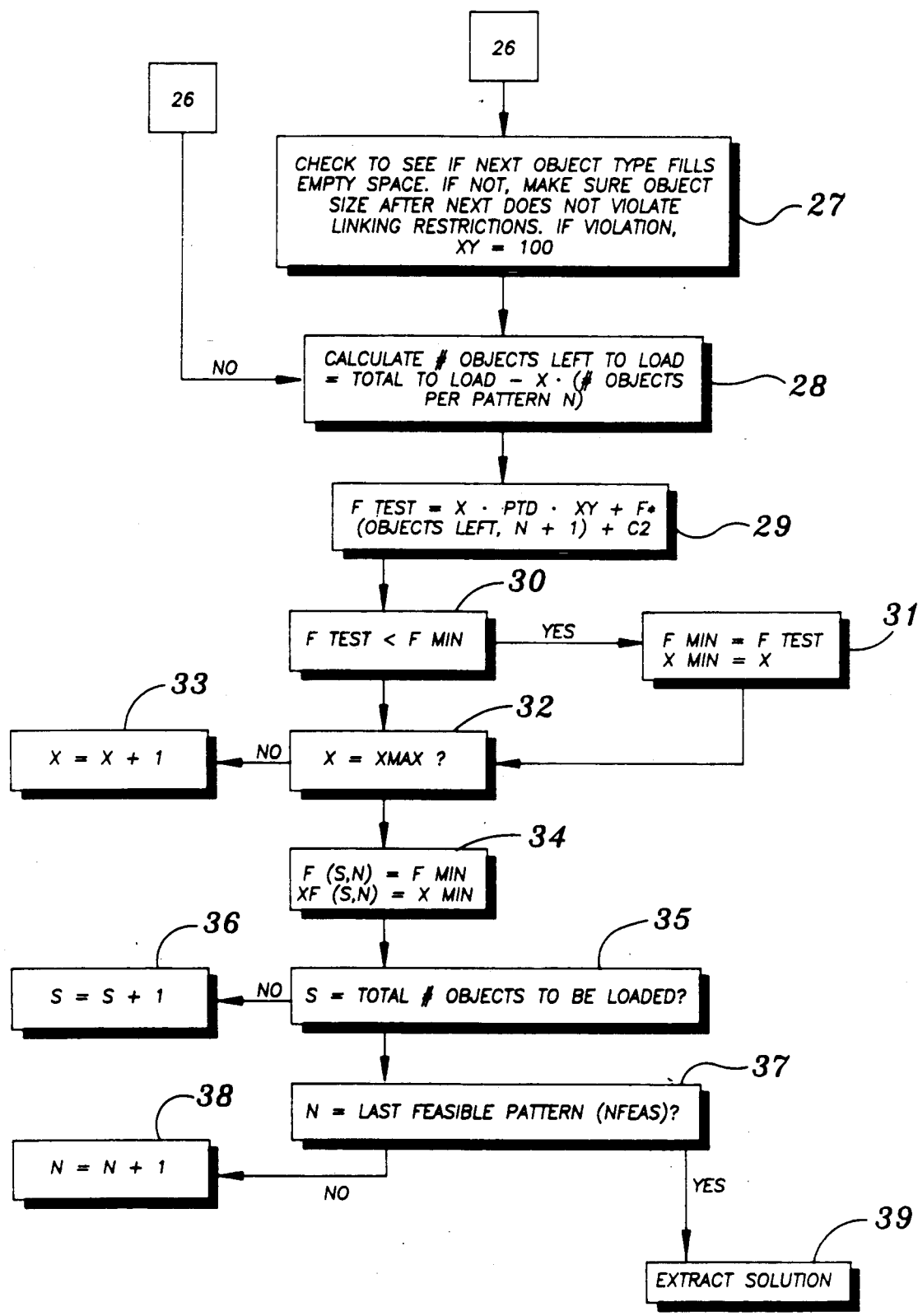
Figure 9C:
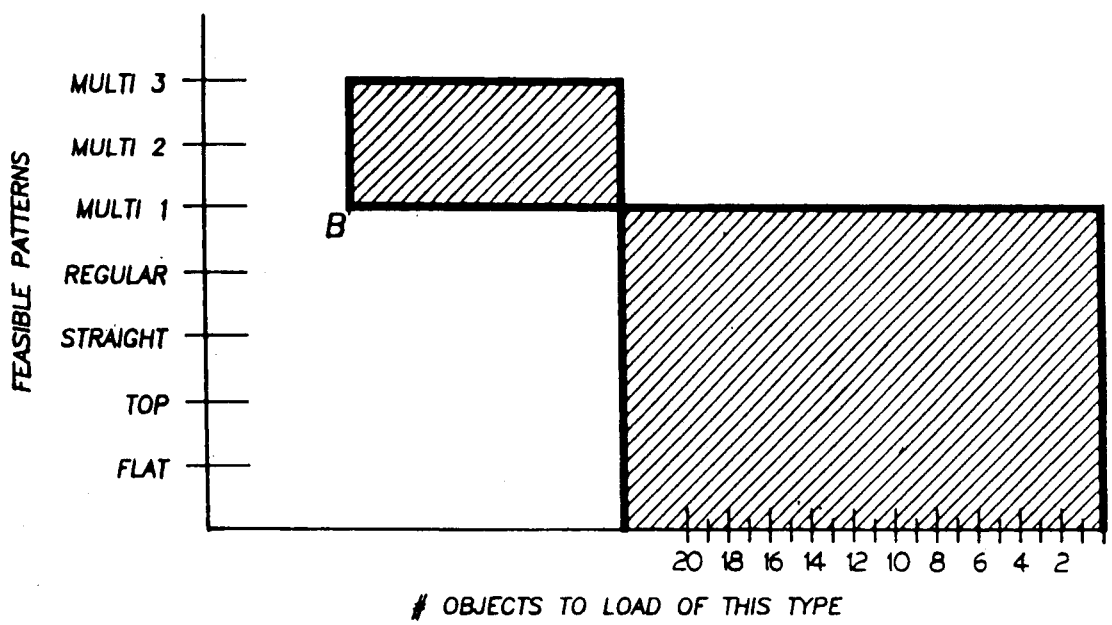

Referring now to FIG. 9A and 9B, the steps of the object placement method for determining the optimum patterns for placing the greatest number of objects consistent with a requisite stability factor is shown. Preferably, these steps are implemented in a dynamic programming algorithm using a modified matrix as is well known to those skilled in the art and as described in *Mathematical Programming*, Chapter 14, "Deterministic Dynamic Programming," pages 154-161. To determine the optimum pattern, first the number of objects left to load and the current number of feasible patterns being evaluated are provided, block 17 of FIG. 9A. The selection of feasible patterns is discussed with reference to block 71 of FIG. 6. Next, a feasible pattern (N) is selected from the group of feasible patterns, block 18. The volume of each feasible pattern is calculated as they are analyzed, block 19. Here, penalty factors may be assigned to certain patterns or pattern types, depending upon the pattern's performance with respect to the constraint factors such as stability, damage potential, loading ease, or other type factors. For example, if the constraint factor is stability, each type of pattern (multiline, regular, flat, top, or straight) may be penalized with reference to the stability factor associated with each type pattern. For example, flat type patterns may be penalized by a 20% increase in pattern volume and top type patterns 12% in pattern volume. From these percentages it is apparent that flat type patterns are less stable than top type patterns.

The determination of patterns for placement of each object size (or collection of similar object sizes) is divided into two portions. First, a combination of more efficient type (multiline type) patterns is provided as described in block 71 which loads a large number of objects. Objects are placed in the more efficient patterns selected. Following this step, a combination of less efficient (non-multiline) type patterns are selected to load any remaining objects, if any. This two-step process is represented in FIG. 6, blocks 73-78 and block 170.

In the example where placement characteristic type is the object size, and the constraint is stability, the initial selection of multiline type patterns to place as many objects as possible is based on the following:

(1) Multiline patterns are usually more efficient than non-multiline patterns of the same dimensions (i.e, they place a larger number of objects in a smaller volume with greater stability than other pattern types). A multiline type pattern is excluded from the set of feasible patterns if a non-multiline type pattern is found which places a greater number of objects. While some flat patterns are more efficient than multiline type patterns, they are penalized in the selection process to reflect their unstable loading characteristics; and (2) Multiline type patterns require five to ten times more cases than single line patterns. A larger number of cases can be loaded using only a few multiline patterns resulting in fewer iterations within the method.

After calculating the volume of the patterns being considered, the method constructs a matrix for determination of the multiline and/or single line patterns to be used, block 20. One axis of the matrix contains the number of objects of a specific type or similar types to be loaded. The other axis contains the set of feasible patterns. See FIG. 9C.

Figure 9D:
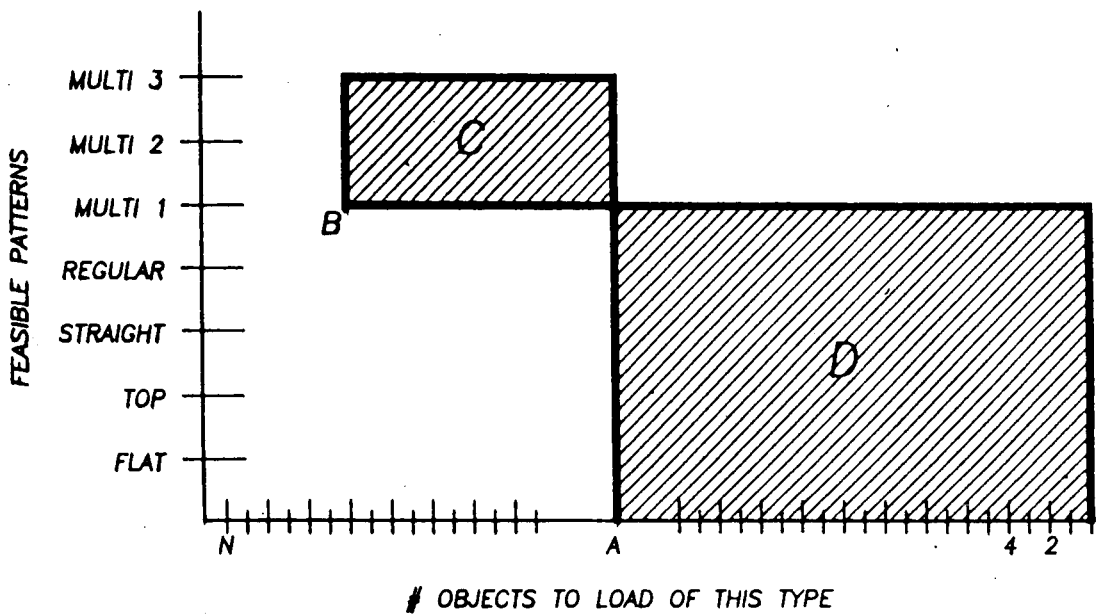

The matrix may be divided into four portions, only two of which are needed for calculation for the determination of optimal multiline patterns for object placement as seen in FIG. 9D. The matrix is divided through the x axis at the point A where the number of objects to be placed equals the number of objects placed in the smallest multiline pattern. The matrix is again divided between the multiline and single line type patterns at point B. Only the shaded portion C of the matrix need be considered for the feasible multiline patterns.

Next, the calculation is made for each point within the area of matrix being considered. This calculation determines the maximum numbers of patterns needed to load S objects. S is the number of objects being considered during that calculation which can be any number from one up until the total number of objects of the type being considered. If the calculation results in a fraction, the result is rounded upwards, block 21. Two characteristics are determined here. First, the number of times a pattern must be used to place a specific number of objects and second, the amount of space used by that pattern to place the specific number of objects.

If, however, the objects of the type being considered which remain in an unfilled final pattern line of the multiline pattern violate a linking restriction, XMAX is reduced by one in order to avoid violation of that linking restriction block 22. In addition, if the multiline pattern has a number of empty spaces beyond a predetermined amount, XMAX can also be reduced by one.

In block 23, the variable X, which is the number of repetitions of a particular feasible pattern, is set to one. Once X is set to one, the area used by a pattern is calculated. The area used is calculated for one pattern repetition to the situation where the number of pattern repetitions equals XMAX. In order to accurately determine the area used by a pattern, the number of empty spaces in a pattern is first calculated, block 24. If the number of empty spaces within a pattern is greater than 4, block 26, a check is made to determine if the next object size totally fills the empty space. Refer to block 27 of FIG. 9B. If the next object size does not fill the empty space, another check is made to ensure that the object size after next does not violate any linking restrictions. If such a violation occurs, a factor is entered into the calculation of the pattern area which will result in the pattern area being so large that it will never be chosen. Thus, linking violations between the second and third object types in a pattern line are avoided. If there are less than a predetermined number of empty spaces in the pattern, the method calculates the number of this type object left to load after placement within the feasible pattern being considered. The number of repetitions of the pattern is also taken into account, block 28.

Next, the area of the pattern is calculated block 29. This calculation takes into account the number of repetitions of the particular pattern being considered. In addition, the best solution for the remaining number of cases to be loaded is also incorporated into the total area (FTEST). The best solution for loading the remaining number of cases is also represented in terms of volume. The best solution for the remaining objects may also be calculated using a dynamic programming algorithm. After calculating the volume for the pattern being considered, its volume is compared to any previously calculated minimum (FMIN). If FTEST is less than FMIN, FMIN becomes FTEST and the minimum number of repetitions (XMIN) is the number of repetitions for the pattern being considered, block 31. If FTEST is not less than FMIN, FMIN remains the same. Next, a check is made as to whether or not the number of repetitions being considered is equal to the maximum number of repetitions (XMAX) block 32. If X does not equal XMAX, X is increased by one and the program returns to block 24. If X does equal XMAX, the answer for one cell of the matrix will have been calculated and will equal the value of FMIN for that cell. The number of repetitions for that solution will be XMIN, block 34. FMIN and XMIN are stored for that particular cell within the matrix.

After storing the solution for one cell of the matrix, the method next checks to see whether a solution has been determined for all cells in a row (i.e., one pattern type) of the portion of the matrix being considered block 35. If all of the cells for a particular pattern type have not been considered, the number of objects being considered is increased by one block 36 and the program returns to block 21 to calculate the XMAX for a new cell and the optimal solution for that new cell.

If all cells for a particular pattern type have been considered, the method proceeds to block 37 where a check is made to see whether or not the last feasible pattern type has been considered. If not, the next pattern type is considered block 38 and the program returns to block 19 to start the calculations for the next pattern type.

When the solution and number of repetitions for all cells and all pattern types have been considered, the solution is extracted, block 39. Preferably, the patterns picked first by the solution are the pattern types placing the most number of objects. The method then picks, from the pattern types placing the most number of objects, the solution in which the most objects are placed per pattern. Note that the same algorithm is performed for both consideration of the multiline type patterns and the single line type patterns. The matrix for consideration of single line type patterns will consider only cells in the shaded D portion of FIG. 9D.

Figure 10:
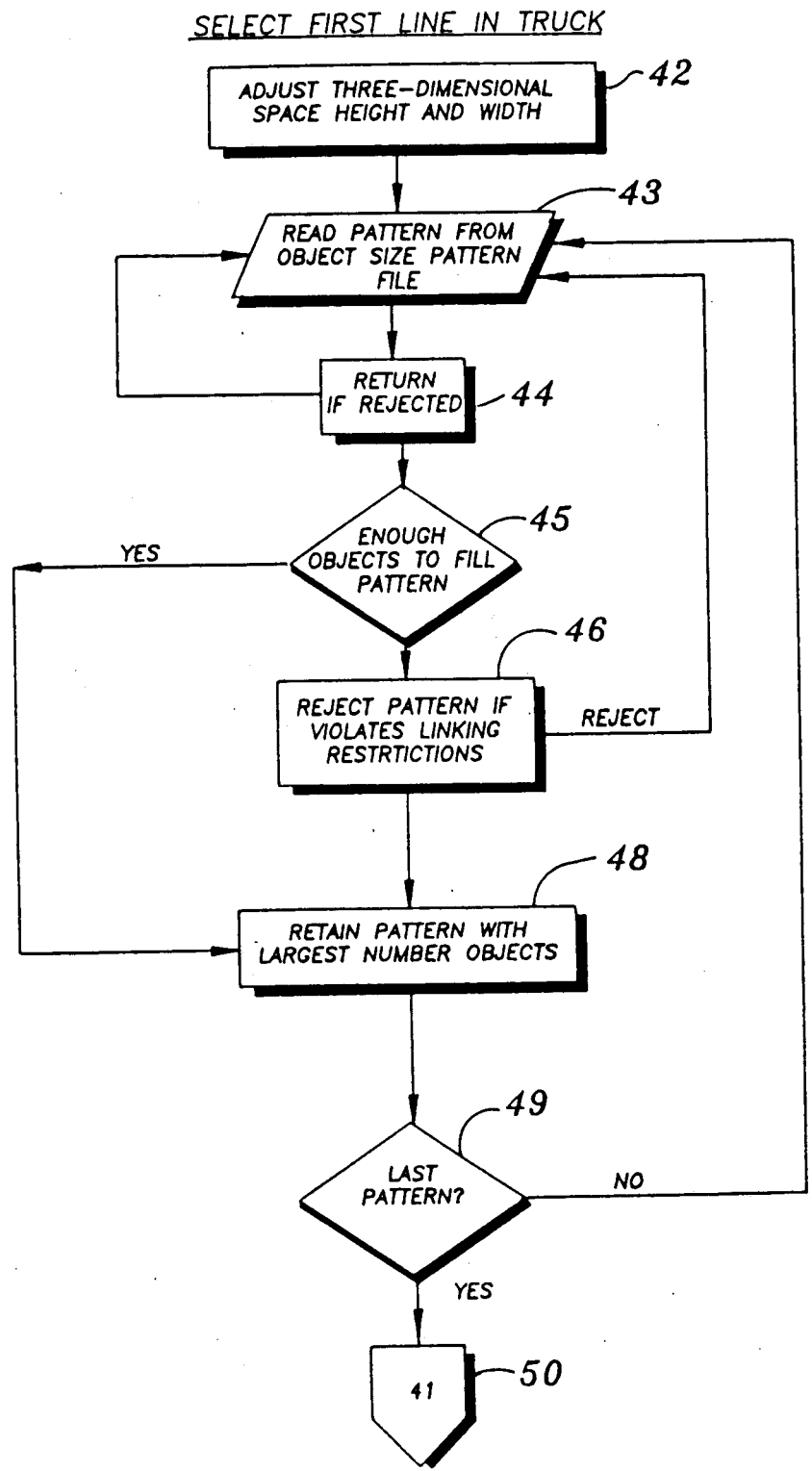
FIG. 10 illustrates an alternative for determining the first pattern in the three-dimensional space when the space is irregular.

Referring now to FIG. 10, pattern adjustment for an irregular three-dimensional space is shown as referred to in block 41 of FIG. 2. Such an irregular space typically occurs in a tractor trailer truck where the front portion of the trailer may have a round nose or may have a refrigeration unit. The first step in adjusting the patterns for the irregular spaced volume requires the provision of information describing the irregular space, block 42. For example, if the three-dimensional space is a tractor trailer with a rounded nose, the width is adjusted to 5 feet. If the three-dimensional space is refrigerated tractor trailer truck, the truck height is adjusted to account for the refrigeration unit. Next, the method takes a pattern from the object size dimensions file 161 and analyzes the pattern, block 43. The pattern will be rejected if any of the following conditions occur: (1) the pattern does not fit the height of the truck (as adjusted); (2) the pattern does not fit the width of the truck (as adjusted); and (3) the pattern is a (multiline) pattern type having more than one pattern line per pattern. If the pattern being analyzed is rejected for one of these reasons the method returns to the object size pattern file 161 and analyzes a new pattern, block 44.

Once a pattern has been selected that does not violate any of the three restrictions above, the program checks whether or not there are enough objects to fill the selected pattern 45. If there are more than 4 empty spaces left in the pattern, that pattern must satisfy the linking restrictions since another type object will fill the remaining area in the pattern line discussed with references to FIG. 3, FIG. 7, and FIG. 8. If the pattern is rejected for violating a linking restriction, the method returns to 43 where a new pattern is selected at block 46.

Patterns that are not rejected are stored in memory along with the number of objects they store, block 48. Only the pattern with the largest number of objects placed remains stored in memory. If the pattern last analyzed is not the last pattern, the program returns to 43 and analyzes the next pattern, block 49. If the most recently analyzed pattern is the last pattern, the method returns to block 41 in FIG. 2.

Note that if the first size object does not completely fill the first pattern, succeeding size objects must be considered for the first pattern line. In this situation a linking line is determined (i.e., the method performs through the steps of FIG. 7).

As referred to in the description of FIG. 2, after all objects to be loaded have been placed in patterns, the object placement method 10 checks to see if the total pattern length within the three-dimensional space is within a predetermined range from the end of the three-dimensional space, blocks 110A-C. Preferably, the adjustment is made in the following manner. First, the initial proposed solution is considered at block 111 in FIG. 11. The solution is stored and specified as the "best solution." The best solution is the solution that has a total pattern length closest to a predetermined distance from the end of the three-dimensional space which does not exceed the space.

If this is not the first iteration through this portion of the method, the method compares a new solution to the stored "best" solution 112. If the new solution is closer to the optimal distance than the stored solution, the stored solution is erased and the new solution is placed into memory.

The new solution's length is then checked to determine whether or not it is within an acceptable range, block 114. If it is, the program returns to block 130 of FIG. 2. If, however, the range is not acceptable, the method requires an attempt to remove or add a pattern line, block 115. Removal of a pattern line requires that the total length of the pattern lines within the three-dimensional space exceeds the length of the three-dimensional space. Addition of a pattern requires that the total length of the pattern lines within the three-dimensional space fall so short of the length of the three-dimensional space that another line may be placed within the space. If these conditions are met, a pattern line is removed or added, block 116. This new solution is then compared to the stored best solution block 113. If a pattern line cannot be removed or added, the method determines whether or not only efficient type (multiline) patterns are available in the best solution or if only series of three iterations at the same pattern are available block 117. If only efficient type patterns or three iterations of the same pattern are available, less strict length requirements are set block 119. Since these patterns and series of patterns are so efficient, they will not be adjusted unless there is a great need to do so. The less strict length requirements of block 119 take this into account. If the efficient patterns still do not meet the less strict requirements, the efficient patterns are broken and several less efficient or single line type patterns are substituted at block 110c in FIG. 2. The method then reoptimizes from this point forward within the solution block 60 in FIG. 2.

Referring back to FIG. 11, if a determination is made in block 117 that less efficient patterns are available, other pattern solutions are attempted block 118 and compared to the stored best solution block 113.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for placing physical objects of differing placement characteristic types in a physical three-dimensional space of predetermined size, comprising the steps of:

(a) storing in a computer, a library of object placement patterns, each pattern in the library representing placement of a plurality of objects;

(b) storing in the computer, a representation of the physical objects to be placed and a representation of the physical three-dimensional space in which the physical objects are to be placed;

(c) selecting, in the computer, from the stored representation of the physical objects, a given number of first type representation of an object to be placed in the representation of the three-dimensional space;

(d) choosing, in the computer, from the stored library, a pattern set comprising at least one pattern for placement of said first type representation of an object in the representation of the three-dimensional space which minimizes the portion of said representation of the three-dimensional space used, to place the given number of first type representation of objects within a portion of the representation of the three-dimensional space consistent with at least one constraint factor;

(e) repeating steps (c) and (d) in the computer, for the remaining representations of objects to be placed in the representation of the three-dimensional space, to thereby place the representation of the physical objects in the representation of the physical three-dimensional space;

(f) producing an indication of the placed representation of the objects in the representation of three-dimensional space; and (g) placing the physical objects in the physical three-dimensional space in conformance with the indication of the placed representation of the objects in the representation of three-dimensional space.

2. The method of claim 1 wherein the physical three-dimensional space is a truck and wherein the physical objects are cartons.

3. The method of claim 1 wherein said selecting step (c) comprises the step of selecting all representations of objects of the first type.

4. The method of claim 1 wherein the stored library of patterns comprises a plurality of patterns grouped into pattern types according to like object orientation; and wherein said choosing step (d) comprises the steps of:

identifying at least one pattern from each pattern type which maximizes the loading efficiency for the first type representation of objects; and determining which of the identified patterns minimizes the portion of the representation of the three-dimensional space used to place the first type objects consistent with at least one predetermined constraint.

5. The method of claim 1 further comprising the step of:

for each pattern set, if area remains unfilled after said choosing step (d), determining a number of representations of objects of a succeeding object type for placement within the remaining area of the pattern set.

6. The method of claim 5 wherein said determining step further comprises:

determining an arrangement for the number of representations of objects of a succeeding object type.

7. The method of claim 6 wherein the arrangement maximizes the number of succeeding representations of objects placed in the unfilled area.

8. The method of claim 6 wherein the arrangement minimizes the amount of space used to place the succeeding type representations of objects.

9. The method of claim 1 wherein the differing placement characteristic types are different physical object dimensions.

10. The method of claim 1 further comprising the step of storing in the computer, linking restrictions between the representations of objects of differing types, the linking restrictions comprising selected patterns from the library which may not be employed with the representations of objects of differing types in a pattern of the representation of three-dimensional space; and wherein said choosing step (d) comprises the step of selecting at least one pattern which minimizes the portion of the representation of three-dimensional space used to place the first type objects consistent with the at least one constraint factor, and which does not violate the linking restrictions.

11. The method of claim 10 wherein said different placement characteristic types are different object dimensions and wherein said linking restrictions are determined by comparing the dimensions of the differing object types.

12. The method of claim 11 wherein the comparison is made to determine how to place the representation of differing type objects within the representation of the three-dimensional space to obtain object stability.

13. The method of claim 2 wherein said choosing step (d) id preceded by the step of:

adjusting at least one of the patterns for an irregularly shaped portion of the representation of the three-dimensional space.

14. A method for placing physical objects of differing sizes in a three-dimensional space of a predetermined size, comprising the steps of:

(a) storing in a computer, a library of object placement patterns, each pattern in the library representing placement of objects in a row of three-dimensional space, the library of patterns having several different pattern types;

(b) storing in the computer, a representation of the physical objects to be placed and a representation of the physical three-dimensional space in which the physical objects are to be placed;

(c) determining, in the computer, which of the pattern types are feasible for placing the stored representation of the physical objects;

(d) selecting, in the computer, a pattern set comprising at least one pattern from each feasible pattern type which minimizes the portion of the representation of the three-dimensional space used to place a given number of representations of first type objects consistent with at least one constraint factor;

(e) choosing, in the computer, which of the selected patterns minimizes the portion of the representation of the three-dimensional space used to place a given number of representations of first type objects consistent with the constraint factor associated therewith;

(f) for each pattern set, if a pattern remains unfilled after all representations of objects of the first size are placed, determining which pattern minimizes the portion of the representation of the three-dimensional space used to place the representation of objects of a succeeding size in the unfilled pattern;

(g) repeating steps (d), (e) and (f) in the computer, for the remaining representations of objects to be placed in the representation of the three-dimensional space, to thereby place the representation of the physical objects in the representation of the physical three-dimensional space;

(h) producing an indication of the placed representation of the objects in the representation of three-dimensional space; and (i) placing the physical objects in the physical three-dimensional space in conformance with the indication of the placed representation of the objects in the representation of three-dimensional space.

15. The method of claim 14 wherein the three-dimensional space is a truck and wherein the three dimensional objects are cartons.

16. The method of claim 14 wherein said storing step further comprises the step of:

storing, in the computer, linking restrictions between the representations of differing object sizes, the linking restrictions comprising pattern types which may not be employed for use with more than one object size in a pattern of the three-dimensional space, and wherein said selecting step comprises the steps of determining which of the patterns minimizes the portion of said representation of three-dimensional space used to place the number of objects of the first size consistent with the constraint factor, and which does not violate the linking restrictions.

17. The method of claim 16 wherein the different placement characteristic types are different object dimensions and wherein the linking restrictions are determined by comparing the dimensions of the differing object types.

18. The method of claim 17 wherein the comparison is made to determine how to place said differing type objects within said three-dimensional space to obtain maximum loading efficiency and maximum stability.

19. The method of claim 14 wherein said selecting step is preceded by the step of:
adjusting at least one of the patterns for an irregularly shaped portion of the three-dimensional space.

20. The method of claim 14 wherein the constraint comprises object stability within the patterns of said three-dimensional space.

21. A method for placing objects of at least two differing placement characteristic types in a three-dimensional space of a predetermined size, comprising the steps of:
(a) storing, in a computer, a library of patterns, each pattern representing placement of objects within said pattern;
(b) storing in the computer, a representation of the physical objects to be placed and a representation of the physical three-dimensional space in which the physical objects are to be placed;
(c) determining linking restrictions between the representations of objects of differing placement characteristic types, the linking restrictions comprising selected patterns which may not be employed for placement of differing object types in a pattern within said three-dimensional space;
(d) selecting a pattern for each group of objects, which places said differing placement characteristic type groups of objects without violating the linking restrictions;
(e) repeating step (d) in the computer, for the remaining representations of objects to be placed in the representation of the three-dimensional space, to thereby place the representation of the physical objects in the representation of the physical three-dimensional space;
(f) producing an indication of the placed representation of the objects in the representation of three-dimensional space; and
(g) placing the physical objects in the physical three-dimensional space in conformance with the indication of the placed representation of the objects in the representation of three-dimensional space.

22. The method of claim 21 wherein said three-dimensional space is a truck and wherein said objects comprise cartons.

23. The method of claim 21 wherein the placement characteristic types are object sizes and the linking restrictions are determined based upon the difference in object dimensions.

24. The method of claim 21 wherein the patterns are grouped into differing pattern types and wherein the linking restrictions comprise selected pattern types which may not be employed for placement of differing object types in a pattern within said three-dimensional space.

25. The method of claim 24 wherein said pattern types are based on the orientation of objects within said patterns.

26. Apparatus for placing physical objects of differing placement characteristic types in a physical three-dimensional space, comprising:
a library of electronically stored object placement pattern, each pattern in said library representing placement of a plurality of objects;
means for electronically storing a representation of the physical objects to be placed and a representation of the physical three-dimensional space in which the physical objects are to be placed; and,
an electronic controller, comprising:
means for selecting a given number of representations of a first type object to be placed in the representation of said three-dimensional space;
means for choosing from said library a pattern set comprising at least one pattern for placement of representation of the first type object in the representation of the three-dimensional space which minimizes the portion of said three-dimensional space used to place said given number of representations of the first type objects within a portion of the representation of said three-dimensional space consistent with at least one constraint factor;
means for generating instructions for placing the physical objects in the physical three dimensional space based upon the placement of the representation of the first type object in the representation of the three-dimensional space; and
means for placing said objects into said three dimensional space according to the selected patterns.

27. The apparatus of claim 26 wherein said three dimensional space is a truck and wherein said objects are cartons.

28. The apparatus of claim 26 wherein said differing placement characteristic types are different object dimensions.

29. The apparatus of claim 26 further comprising means for electronically storing linking restrictions between said objects of differing types, said linking restrictions comprising selected patterns from said library which may not be employed with said objects of differing types in a pattern of said three-dimensional space; and
wherein said choosing means comprises means for selecting at least one pattern which minimizes the portion of said three-dimensional space used to place said first type objects consistent with at least one constraint factor, and which does not violate said linking restrictions.

30. The apparatus of claim 26 wherein said electronic controller further comprises:
means for adjusting said patterns if the total length of the patterns is outside a predetermined range.

31. The apparatus of claim 26 wherein said library of patterns comprises a plurality of patterns grouped into pattern types according to like object orientation; and wherein said choosing means comprises:
means for identifying at least one pattern from each pattern type which maximizes the loading efficiency for the representation of said first type objects; and
means for determining which of the identified patterns minimizes the portion of the representation of said three-dimensional space used to place the representation of said first type objects consistent with at least one predetermined constraint.

32. The apparatus of claim 26 wherein said constraint factor comprises object stability within said patterns of said three-dimensional space.

33. The apparatus of claim 26 wherein said placement characteristic is object dimensions and said linking restrictions apply when the differences in object dimensions between different size objects exceeds a predetermined range.

34. Apparatus for placing objects of differing sizes in a three-dimensional space of a predetermined size, comprising:
 a library of electronically stored object placement patterns, each pattern in said library representing placement of objects in a row of said three-dimensional space, which place a number of the objects in that row, said library of patterns having several different pattern types;
 means for electronically storing a representation of the physical objects to be placed and a representation of the physical three-dimensional space in which the physical objects are to be placed; and,
 an electronic controller, comprising:
  means for determining which of said pattern types are feasible;
  means for selecting a pattern set comprising at least one pattern from each feasible pattern type which minimizes the portion of said three-dimensional space used to place a given number of first type objects within said three-dimensional space consistent with at least one constraint factor
  first means for choosing which of the selected patterns minimizes the portion of said representation of said three-dimensional space used to place a given number of representations of first type objects consistent with said constraint factor associated therewith;
  means for identifying which pattern minimizes the portion of said representation of said three-dimensional space used to place the representation of objects of a succeeding size in the unfilled pattern for each row, if a pattern remains unfilled after all representations of objects of said first size are placed;
  means for generating instructions for placing the physical objects in the physical three dimensional space based upon the placement of the representation of the first type object in the representation of the three-dimensional space; and
  means for placing said objects into said three-dimensional space according to the selected patterns.

35. The apparatus of claim 34 wherein said three dimensional space is a truck and wherein said objects are cartons.

36. The apparatus of claim 34 wherein said library of patterns further comprises linking restrictions between said representations of differing object sizes, said linking restrictions comprising pattern types which may not be employed for use with more than one object size in a pattern of said three-dimensional space; and wherein said means for selecting comprises means for selecting which of said patterns minimizes the portion of representations of said representation of three-dimensional space used to place the number of objects of said first size consistent with said constraint factor, and which does not violate said linking restrictions.

37. The apparatus of claim 34 wherein said electronic controller comprises:
 means for adjusting said rows if the total length of the rows exceeds a predetermined length.

38. The apparatus of claim 34 wherein said electronic controller comprises means for selecting a unique pattern for said first row of said three-dimensional space.

39. The apparatus of claim 34 wherein said constraint factor comprises object stability within said patterns of said three-dimensional space.

40. The apparatus of claim 34 wherein said placement characteristic is object dimensions and said linking restrictions apply when the differences in object dimensions between different size objects exceeds a certain range.

41. Apparatus for placing of objects of at least two differing placement characteristic types in a three-dimensional space, comprising:
 a library of electronically stored patterns, each pattern representing placement of objects within said pattern;
 means for identifying linking restrictions between said objects of differing placement characteristic types, said linking restrictions comprising selected patterns which may not be employed for placement of differing object types in a pattern within said three-dimensional space;
 means for selecting a pattern set comprising at least one pattern which places said differing placement characteristic type objects without violating said linking restrictions;
 means for generating instructions for placing the physical objects in the physical three dimensional space based upon the placement of the representation of the first type object in the representation of the three-dimensional space; and
 means for placing said objects into said three-dimensional space according to the selected patterns.

42. The apparatus of claim 41 wherein said three dimensional space is a truck and wherein said objects are cartons.

43. The apparatus of claim 41 wherein said placement characteristic types are object sizes and said linking restrictions are determined based upon the difference in object dimensions.

44. The apparatus of claim 41 wherein said library of patterns include differing pattern types and wherein said linking restrictions comprise selected pattern types which may not be employed for placement of differing object types in a pattern within said three-dimensional space.

* * * * *

UNITED STATES PATENT AND TRADEMARK OFFICE
CERTIFICATE OF CORRECTION

PATENT NO. : 5,050,090

DATED : September 17, 1991

INVENTOR(S) : Golub et al

It is certified that error appears in the above-identified patent and that said Letters Patent is hereby corrected as shown below:

Column 9, line 67, "therefor" should be --therefore--.

Column 18, line 6, "id" should be --is--.

Column 20, line 8, "pattern," should be --patterns,--.

Signed and Sealed this

Ninth Day of March, 1993

Attest:

STEPHEN G. KUNIN

Attesting Officer

Acting Commissioner of Patents and Trademarks